(12) United States Patent
Maki et al.

(10) Patent No.: US 8,332,603 B2
(45) Date of Patent: Dec. 11, 2012

(54) DUAL WRITING DEVICE AND ITS CONTROL METHOD

(75) Inventors: Nobuhiro Maki, Yokohama (JP);
Kenichi Oyamada, Yokohama (JP);
Kazuhiko Watanabe, Yokohama (JP);
Masaaki Hosouchi, Zama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/363,402

(22) Filed: Feb. 1, 2012

(65) Prior Publication Data

US 2012/0137096 A1 May 31, 2012

Related U.S. Application Data

(63) Continuation of application No. 13/094,481, filed on Apr. 26, 2011, now Pat. No. 8,127,097, which is a continuation of application No. 12/420,339, filed on Apr. 8, 2009, now abandoned, which is a continuation of application No. 11/454,860, filed on Jun. 19, 2006, now abandoned.

(30) Foreign Application Priority Data

Apr. 18, 2006 (JP) .................................. 2006-114236

(51) Int. Cl.
*G06F 12/14* (2006.01)
*G06F 12/16* (2006.01)

(52) U.S. Cl. ................. 711/162; 711/163; 711/E12.096; 711/E12.103

(58) Field of Classification Search .................. 711/162, 711/E12.103, 163, E12.091, E12.096, E12.098
See application file for complete search history.

(56) References Cited

U.S. PATENT DOCUMENTS

| | | | |
|---|---|---|---|
| 5,761,705 A | 6/1998 | DeKoening et al. | |
| 6,539,462 B1 | 3/2003 | Mikkelsen et al. | |
| 6,643,667 B1 * | 11/2003 | Arai et al. | 707/640 |
| 7,047,256 B2 | 5/2006 | Miki et al. | |
| 7,124,244 B2 | 10/2006 | Shimada | |
| 7,225,191 B1 | 5/2007 | Black | |

(Continued)

FOREIGN PATENT DOCUMENTS

JP    10-105467    4/1998

(Continued)

OTHER PUBLICATIONS

Office Action in JP 2006-114236, dated Apr. 5, 2011 (in Japanese, 3 pgs.) [partial translation/concise explanation].

*Primary Examiner* — Hal Schnee
(74) *Attorney, Agent, or Firm* — Antonelli, Terry, Stout & Kraus, LLP.

(57) ABSTRACT

A computer system and method which stores path definition information including a storage ID, a volume ID, and validities of paths between a host computer and a first or second storage system identified by the storage ID for accessing a volume identified by the volume ID in one of the storage systems, sends an I/O request via the paths, based on the path definition information, receives information indicating the storage and volume IDs, and updates the path definition information. During initial copying from the second to the first volume, validity corresponding to a first path is set to "Invalid" and validity corresponding to a second path is set to "Valid". After completion of initial copying, the validity corresponding to the first path included in the path definition information is changed to "Valid."

12 Claims, 21 Drawing Sheets

PATH DEFINITION TABLE

U.S. PATENT DOCUMENTS

| | | |
|---|---|---|
| 7,315,960 B2 | 1/2008 | Takamoto et al. |
| 7,493,466 B2 | 2/2009 | Tamura et al. |
| 2003/0126327 A1 | 7/2003 | Pesola et al. |
| 2003/0200394 A1 | 10/2003 | Ashmore et al. |
| 2004/0103247 A1 | 5/2004 | Bita et al. |
| 2004/0230787 A1 | 11/2004 | Blumenau et al. |
| 2004/0243776 A1 | 12/2004 | Matsui et al. |
| 2004/0260899 A1* | 12/2004 | Kern et al. .................... 711/162 |
| 2005/0188006 A1* | 8/2005 | Fujibayashi .................. 709/203 |
| 2005/0268054 A1* | 12/2005 | Werner et al. ................. 711/162 |
| 2006/0005074 A1 | 1/2006 | Yanai et al. |
| 2006/0031646 A1* | 2/2006 | Maruyama et al. ........... 711/162 |
| 2006/0074957 A1 | 4/2006 | Yamamoto et al. |
| 2006/0136777 A1 | 6/2006 | Terashita et al. |
| 2006/0179170 A1 | 8/2006 | Kodama |
| 2007/0094465 A1 | 4/2007 | Sharma et al. |
| 2010/0281226 A1 | 11/2010 | Maki et al. |

FOREIGN PATENT DOCUMENTS

| | | |
|---|---|---|
| JP | 10-269030 | 10/1998 |
| JP | 10-289187 | 10/1998 |
| JP | 2001-318766 | 11/2001 |
| JP | 2002-032280 | 1/2002 |
| JP | 2003-223286 | 8/2003 |
| JP | 2004-334434 | 11/2004 |
| JP | 2005-025485 | 1/2005 |
| JP | 2005-044010 | 2/2005 |
| JP | 2005-107645 | 4/2005 |
| JP | 2006-048676 | 2/2006 |
| JP | 2006-099309 | 4/2006 |
| WO | WO 01/29647 | 4/2001 |

* cited by examiner

ID MISREPRESENTATION TABLE

COPY INFORMATION TABLE

STORAGE INFORMATION TABLE

PATH GROUP MANAGEMENT TABLE

PATH DEFINITION TABLE

COPY PAIR MANAGEMENT INFORMATION

VOLUME MANAGEMENT INFORMATION

ID MISREPRESENTATION MANAGEMENT INFORMATION

DUAL WRITING DEVICE AND ITS CONTROL METHOD

CROSS-REFERENCE TO RELATED APPLICATIONS

This application is a continuation of U.S. application Ser. No. 13/094,481, filed Apr. 26, 2011 now U.S. Pat. No. 8,127,097, which, in turn, is a continuation of U.S. application Ser. No. 12/420,339, filed Apr. 8, 2009 (now abandoned), which, in turn is a continuation of U.S. application Ser. No. 11/454,860, filed Jun. 19, 2006 (now abandoned), and which application claims priority from Japanese patent application P2006-114236 filed on Apr. 18, 2006, the contents of which are hereby incorporated by reference into this application.

BACKGROUND

This invention relates to a computer system equipped with a first storage system, a second storage system, a host computer, and a management computer, and to a technology for writing data in the first storage system and in the second storage system.

In recent years, data used in a computer system of a company or the like has been growing in importance. Thus, a data protection technology is applied to the computer system. The data protection technology is for recovering data in a faulty computer system. For example, the data protection technology includes a remote copying technology.

An example of the remote copying technology is disclosed in JP 2005-18506 A. According to the remote copying technology, a first storage system stores data received from a host computer. The first storage system transmits data received from the host computer to a second storage system arranged at a physically separated place. The second storage system stores the data received from the first storage system. Even when a fault occurs, the computer system to which the remote copying technology is applied can recover from the fault within a relatively short time. To be specific, the computer system to which the remote copying technology is applied recovers from the fault by using the data stored in the second storage system.

An identification control technology of a plurality of volumes is disclosed in JP 2000-330924 A. A host computer identifies two different volumes accessed through two different paths as identical volumes. Accordingly, even when a fault occurs in one of the paths, the host computer can access data by using the other path.

SUMMARY

When one of the remote copying technology and the identification control technology of the plurality of volumes is used to write identical data in the two storage systems in a computer system, the following problems occur in the computer system.

In the computer system adopting the remote copying technology, remote copying is carried out between the two storage systems. Accordingly, the host computer cannot read the latest data when it accesses the storage system of a copying destination during the remote copying.

In the computer system adopting the identification control technology of the plurality of volumes, the host computer discretely accesses the two volumes identified as identical volumes. Therefore, it is impossible to maintain data consistency of the two volumes identified as identical volumes.

This invention has been made in view of the foregoing problems, and has an object to provide a computer system in which the latest data can be accessed regardless of which one of the two storage systems is accessed.

According to an exemplary embodiment of this invention, there is provided a computer system, comprising: one or more first storage systems; one or more second storage systems; one or more host computers connected to the first storage system and to the second storage system through a network; and a management computer capable of accessing the first storage system, the second storage system, and the host computers, wherein: the first storage system includes: a first interface connected to the network; a first processor connected to the first interface, a first memory connected to the first processor; and a first disk drive for storing data requested to be written by the host computer; the first storage system sets a storage area of the first disk drive as one or more first volume; the first storage system misrepresents an identifier of the storage system and an identifier of the first volume to the host computer; the first storage system provides the set first volume to the host computer, the second storage system includes: a second interface connected to the network; a second processor connected to the second interface; a second memory connected to the second processor; and a second disk drive for storing data requested to be written by the host computer; the second storage system sets a storage area of the second disk drive as one or more second volume; the second storage system misrepresents an identifier of the storage system and an identifier of the second volume as being identical to those misrepresented by the first storage system to the host computer; the second storage system provides the set second volume to the host computer; the management computer includes: a third interface externally connected; a third processor connected to the third interface; and a third memory connected to the third processor; the host computer includes: a fourth interface connected to the network; a fourth processor connected to the fourth interface; and a fourth memory connected to the fourth processor; the first processor copies data of the first volume in the second volume; the second processor copies data of the second volume in the first volume; the third processor determines whether there is a match between the data of the first volume and the data of the second volume; and if it is determined that there is no match, the fourth processor accesses only one of the first volume and the second volume that stores the latest data.

According to the representative aspect of this invention, the host computer can obtain the latest data by accessing either one of the two storage systems.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

The preferred embodiments of this invention will be described below with reference to the drawings.

(First Embodiment)

Figure 1:
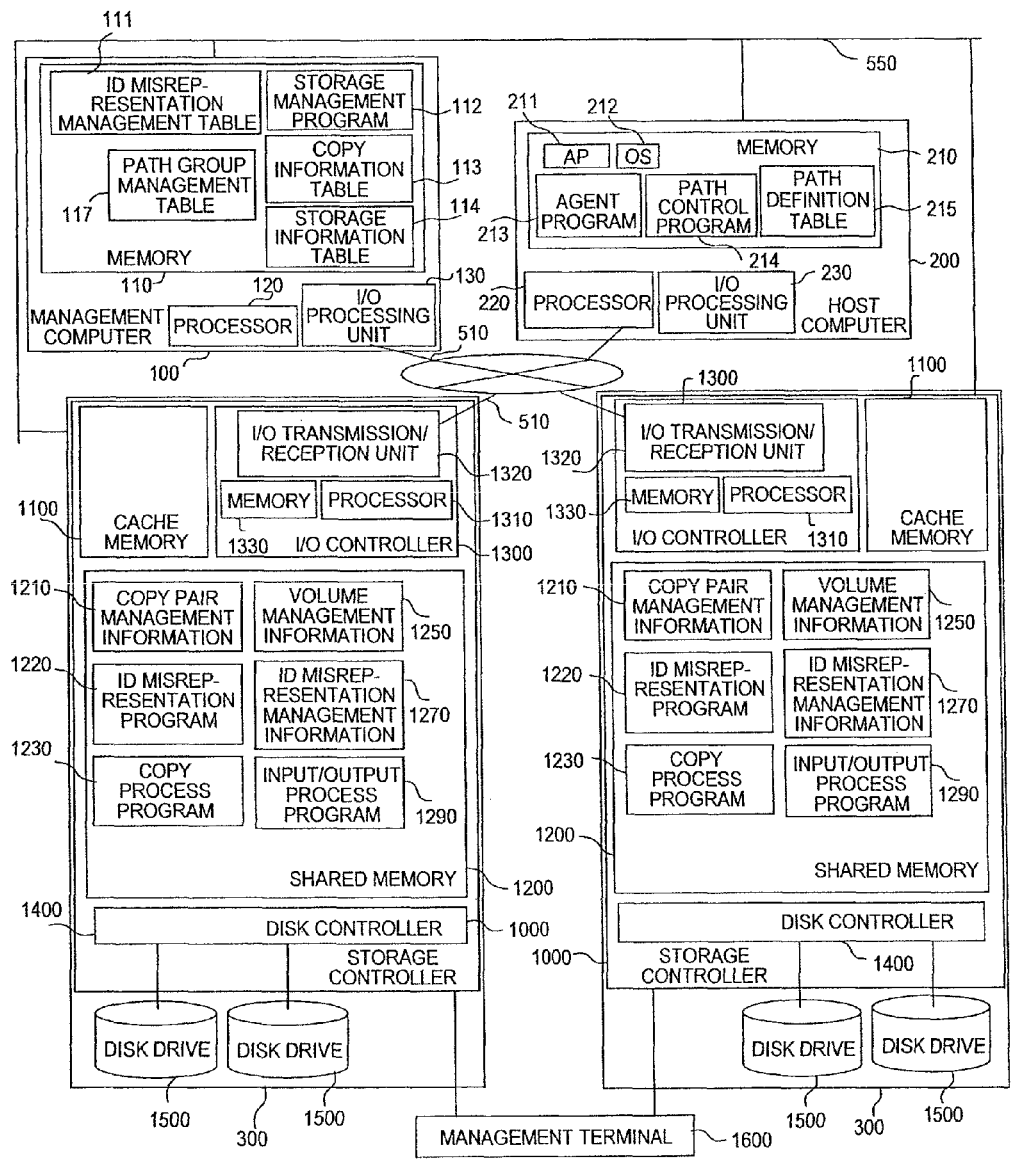
FIG. 1 is a block diagram showing a configuration of a computer system according to a first embodiment of this invention.

FIG. 1 is a block diagram showing a configuration of a computer system according to a first embodiment of this invention.

The computer system includes a management computer 100, a host computer 200, a storage system 300, and a management terminal 1600.

There are one management computer 100 and one host computer 200 shown in the drawing, but the numbers thereof are not limited to one. Two storage systems 300 are shown, but the number thereof is not limited to two.

The management computer 100, the host computer 200, the storage system 300, and the management terminal 1600 are interconnected through a data communication line 510. The host computer 200 is connected to the storage system 300 and the management terminal 1600 through a device control line 550.

The management computer 100 includes a memory 110, a processor 120, and an I/O processing unit 130. The memory 110, the processor 120, and the I/O processing unit 130 are interconnected through an internal network (not shown).

The processor 120 performs various processes by executing programs stored in the memory 110. For example, the processor 120 transmits an I/O request to the storage system 300 to thereby control remote copying executed by the storage system 300. The I/O request includes a writing request, a reading request, and a remote-copying control request. The I/O request will be described below in detail with reference to FIG. 13.

The memory 110 stores the programs to be executed by the processor 120, and information or the like to be required by the processor 120. To be specific, the memory 110 stores an ID misrepresentation management table 111, a storage management program 112, a copy information table 113, a storage information table 114, and a path group management table 117. The memory 110 may further store an operating system (OS) and an application program (AP).

The storage management program 112 manages the storage system 300 connected through the device control line 550.

The ID misrepresentation management table 111 contains information for managing a logical volume in which a storage ID and a logical volume ID are misrepresented. The ID misrepresentation management table 111 will be described below in detail with reference to FIG. 5. The logical volume of the misrepresented storage ID and logical volume ID will be described below in detail with reference to FIG. 2.

The copy information table 113 contains information for managing a configuration and a status of a bi-directional synchronous copy. Accordingly, the memory 110 stores copy information tables 113 as many as the bi-directional synchronous copies managed by the management computer 100. The copy information table 113 will be described below in detail with reference to FIG. 6. The bi-directional synchronous copy will be described below in detail with reference to FIG. 3.

The storage information table 114 contains information regarding the storage system 300 managed by the management computer 100. The storage information table 114 will be described below in detail with reference to FIG. 7.

The path group management table 117 contains information for managing a path, over which the host computer 200 accesses a logical volume of the storage system 300. The path group management table 117 will be described below in detail with reference to FIG. 8.

The I/O processing unit 130 is an interface connected to the host computer 200 and to the storage system 300 through the data communication line 510.

The host computer 200 includes a memory 210, a processor 220, and an I/O processing unit 230.

The memory 210, the processor 220, and the I/O processing unit 230 are interconnected through an internal network (not shown).

The processor 220 performs various processes by executing programs stored in the memory 210. For example, the processor 220 transmits an I/O request to the storage system 300 to thereby access a logical volume supplied from the storage system 300.

The memory 210 stores the programs to be executed by the processor 220, and information or the like to be required by the processor 220. To be specific, the memory 210 stores an application program (AP) 211, an OS 212, an agent program 213, a path control program 214, and a path definition table 215.

The AP 211 executes various processes. For example, the AP 211 provides a database function or a WEB server function. The OS 212 controls the entire process of the host computer 200.

The agent program 213 receives an instruction from the management computer 100. The path control program 214 controls a path used for accessing the logical volume of the storage system 300. The path control program 214 controls the path by referring to the path definition table 215.

The path definition table 215 contains information regarding the path used for accessing the logical volume of the storage system 300. The path definition table 215 will be described below in detail with reference to FIG. 9.

The I/O processing unit 230 is an interface connected to the management computer 100 and to the storage system 300 through the data communication line 510. To be specific, the I/O processing unit 230 transmits an I/O request to the storage system 300.

The storage system 300 includes a storage controller 1000 and a disk drive 1500.

The disk drive 1500 stores data requested to be written by the host computer 200.

The storage controller 1000 controls the entire storage system 300. To be specific, the storage controller 1000 controls data writing in the disk drive 1500 and data reading from the disk drive 1500. The storage controller 1000 supplies a storage area of the disk drive 1500 as one or more logical volumes to the host computer 200. At this time, the storage controller 1000 misrepresents a storage ID and a logical volume ID to supply a logical volume to the host computer 200.

The storage controller 1000 includes a cache memory 1100, a shared memory 1200, an I/O controller 1300, and a disk controller 1400.

The cache memory 1100, the shared memory 1200, the I/O controller 1300, and the disk controller 1400 are interconnected through an internal network (not shown).

The cache memory 1100 temporarily stores data written in the disk drive 1500 and data read from the disk drive 1500.

The disk controller 1400 controls the data writing in the disk drive 1500 and the data reading from the disk drive 1500.

The I/O controller 1300 includes a processor 1310, an I/O transmission/reception unit 1320, and a memory 1330. The processor 1310, the I/O transmission/reception unit 1320, and the memory 1330 are interconnected through an internal network (not shown).

The I/O transmission/reception unit 1320 is an interface connected to the management computer 100, the host computer 200, and the other storage system 300 through the data communication line 510. To be specific, the I/O transmission/reception unit 1320 receives the I/O request from the management computer 100 or from the host computer 200. The I/O transmission/reception unit 1320 transmits the data read from the disk drive 1500 to the management computer 100 or the host computer 200. Further, the I/O transmission/reception unit 1320 transmits/receives data exchanged between the storage systems 300.

The processor 1310 performs various processes by executing programs stored in the memory 1330 or the shaped memory 1200. To be specific, the processor 1310 processes the I/O request received by the I/O transmission/reception unit 1320.

The memory 1330 stores the programs to be executed by the processor 1310, and information or the like to be required by the processor 1310.

The shared memory 1200 stores the programs to be executed by the processor 1310, and information or the like to be required by the processor 1310. The shared memory 1200 stores programs to be executed by the disk controller 1400, and information or the like to be required by the disk controller 1400. To be specific, the shared memory 1200 stores copy pair management information 1210, an ID misrepresentation program 1220, a copy process program 1230, volume management information 1250, ID misrepresentation management information 1270, and an input/output process program 1290.

The copy pair management information 1210 is for managing a copy pair including the logical volume supplied from the storage system 300. The copy pair is constituted of two logical volumes targeted for bi-directional synchronous copy. The bi-directional synchronous copy will be described below in detail with reference to FIG. 3. The copy pair management information 1210 will be described below in detail with reference to FIG. 10.

The ID misrepresentation program 1220 misrepresents a storage ID and a logical volume ID, and supplies a logical volume to the host computer 200. The copy process program 1230 executes initial copy and bi-directional synchronous copy. The input/output process program 1290 processes the I/O request received by the I/O transmission/reception unit 1320.

The volume management information 1250 is for managing the logical volume supplied from the storage system 300. The volume management information 1250 will be described below in detail with reference to FIG. 11.

The ID misrepresentation management information 1270 is for misrepresenting the storage ID and the logical volume ID when the logical volume is supplied to the host computer 200. The ID misrepresentation management information 1270 will be described below in detail with reference to FIG. 12.

The management terminal 1600 is connected to the storage controller 1000 disposed in the storage system 300. The management terminal 1600 is a computer equipped with a processor, a memory, and an interface. The management terminal

1600 transmits information input by a system user to the storage controller 1000 of the storage system 300.

Next, an outline of a process according to the first embodiment of this invention will be described.

Figure 2:
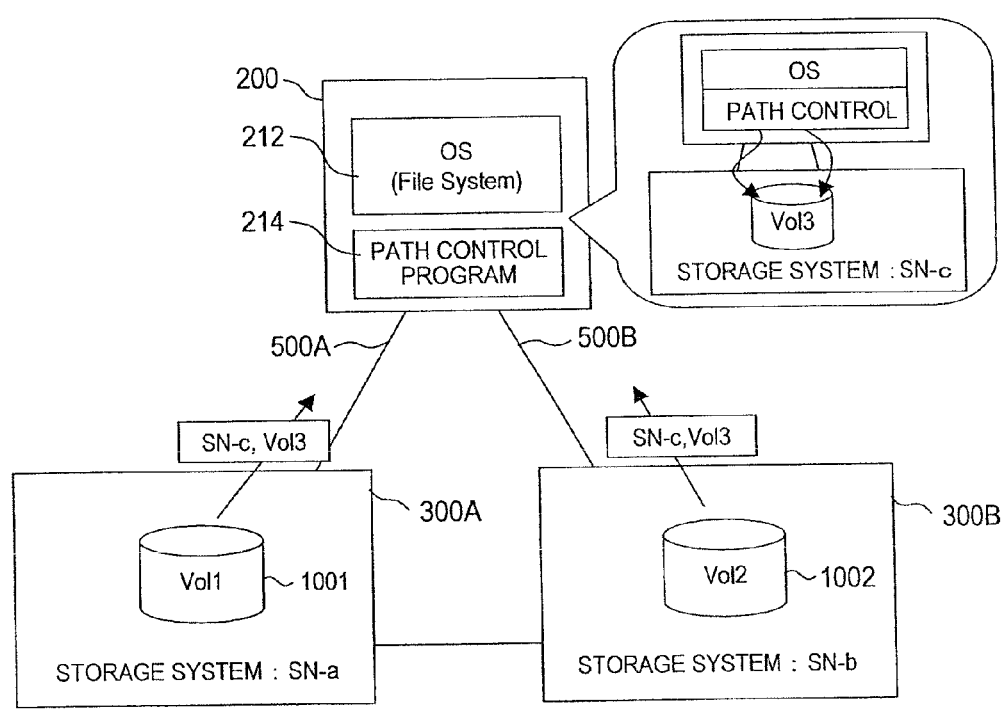
FIG. 2 is an explanatory diagram showing an ID misrepresentation process performed by the storage system according to the first embodiment of this invention.

FIG. 2 is an explanatory diagram showing an ID misrepresentation process performed by the storage system 300 according to the first embodiment of this invention.

The storage system 300 misrepresents a storage ID and a logical volume ID to supply a logical volume to the host computer 200.

For example, a storage system 300A supplies a logical volume 1001 as logical volume identified by a logical volume ID "Vol3" in a virtual storage system identified by a storage ID "SN-c" to the host computer 200.

A storage system 300B supplies a logical volume 1002 as a logical volume identified by a logical volume ID "Vol3" in a virtual storage system identified by a storage ID "SN-c" to the host computer 200.

The host computer 200 accesses the logical volume 1001 of the storage system 300A by using a path 500A. The host computer 200 accesses the logical volume 1002 of the storage system 300B by using a path 500B.

The host computer 200 identifies a logical volume based on a storage ID and a logical volume ID. Accordingly, the host computer 200 identifies the logical volume 1001 of the storage system 300A and the logical volume 1002 of the storage system 300B as identical logical volumes.

As an example, description will be made of a case where the host computer 200 accesses the logical volume identified by the logical volume ID "Vol3" in the virtual storage system identified by the storage ID "SN-c".

In this case, the host computer 200 accesses the logical volume by equally using the path 500A and the path 500B. In other words, the host computer 200 equally accesses the logical volume 1001 of the storage system 300A and the logical volume 1002 of the storage system 300B.

However, when data is written in one logical volume by using a plurality of paths, the host computer 200 does not write any subsequent data until writing of one data is completed.

Figure 3:
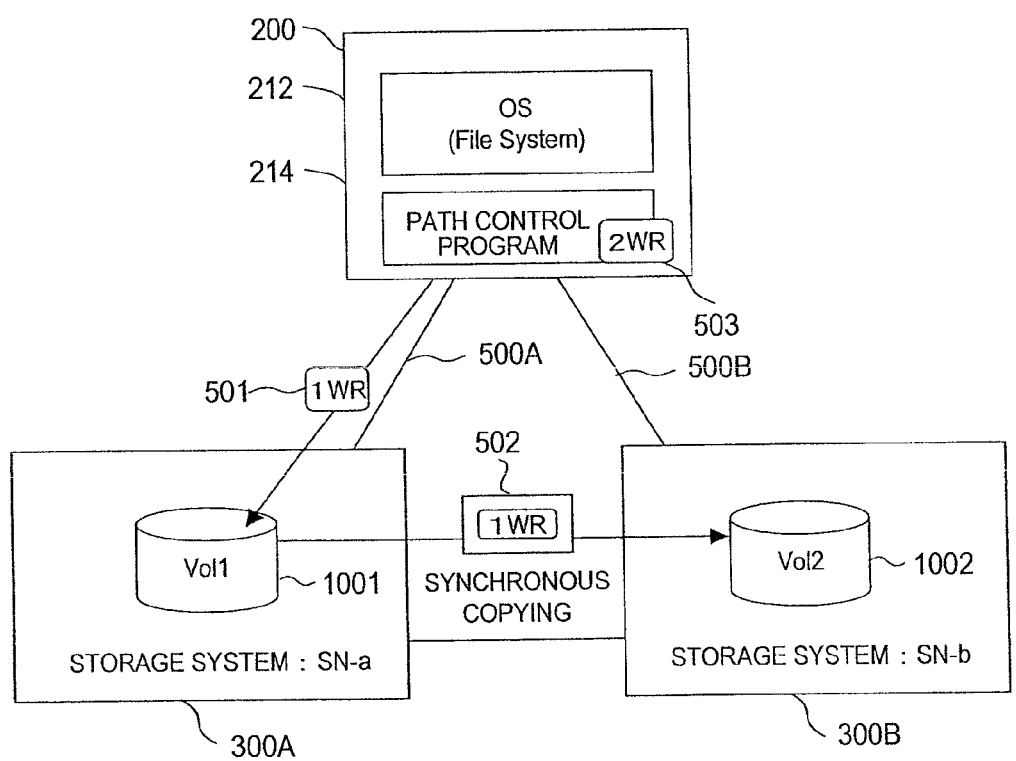
FIG. 3 is an explanatory diagram showing the bi-directional synchronous copy process performed by the storage systems according to the first embodiment of this invention.

FIG. 3 is an explanatory diagram showing the bi-directional synchronous copy process performed by the storage systems 300 according to the first embodiment of this invention.

Each of the storage systems 300 executes bi-directional synchronous copy upon writing of data requested to be written by the host computer 200 in a logical volume. Accordingly, the storage systems 300 have consistency of data stored in two logical volumes identified as identical logical volumes by the host computer 200.

As an example, description will be made of a case where the host computer 200 transmits a writing request 501 to the storage system 300A through the path 500A. The writing request 501 requests writing of data in the logical volume 1001 of the storage system 300A.

The storage system 300A receives the writing request 501 from the host computer 200. Then, the storage system 300A writes write data contained in the received writing request 501 in the logical volume 1001.

The storage system 300A copies in synchronization the write data 502 contained in the writing request 501 in the logical volume 1002 of the storage system 300B.

Here, the synchronous copying process performed by the storage system 300A will be described. The storage system 300A remote-copies the write data 502 contained in the writing request 501 in the logical volume 1002 of the storage system 300B. To be specific, the storage system 300A executes remote-copying by transmitting a data transfer frame containing the write data 502. The data transfer frame will be described below in detail with reference to FIG. 14. Upon completion of the remote-copying of the write data 502, the storage system 300A notifies the host computer 200 of the completion of processing the writing request 501.

Next, description will be made of a case where the host computer 200 transmits a writing request to the storage system 300B through the path 500B. The writing request requests data writing in the logical volume 1002 of the storage system 300B.

The storage system 300B receives the writing request from the host computer 200. Then, the storage system 30013 writes write data contained in the received writing request in the logical volume 1002. Further, the storage system 300B remote-copies the write data contained in the writing request in the logical volume 1001 of the storage system 300A. Upon completion of the remote-copying of the write data, the storage system 300B notifies the host computer 200 of the completion of processing the writing request.

Thus, the storage system 300A and the storage system 300B execute the bi-directional synchronous copy upon reception of the data writing requests. The synchronous copying executed in two-way is bi-directional synchronous copy.

As a result, the data stored in the logical volume 1001 of the storage system 300A matches the data stored in the logical volume 1002 of the storage system 300B.

According to this embodiment, the host computer 200 does not transmit a next writing request 503 to the storage system 300 unless notification of the completion of processing the writing request 501 is given. In other words, the host computer 200 sequentially issues writing requests with respect to one logical volume. Thus, the host computer 200 can maintain the sequence of data writing in the identical logical volumes.

In other words, the host computer 200 does not simultaneously access the two logical volumes identified as identical logical volumes. In this explanatory diagram, the host computer 200 does not simultaneously access the logical volume 1001 of the storage system 300A and the logical volume 1002 of the storage system 300B.

As described above, according to this embodiment, the host computer 200 accesses a logical volume by using a plurality of paths 500. Hence, the host computer 200 can obtain the same data regardless of which one of the plurality of paths 500 is used for accessing the logical volume.

On the other hand, when bi-directional synchronous copy is not executed, the data stored in the logical volume 1001 of the storage system 300A does not match the data stored in the logical volume 1002 of the storage system 300B. In this case, data obtained by the host computer 200 varies depending on a path used for accessing the logical volume.

Figure 4:
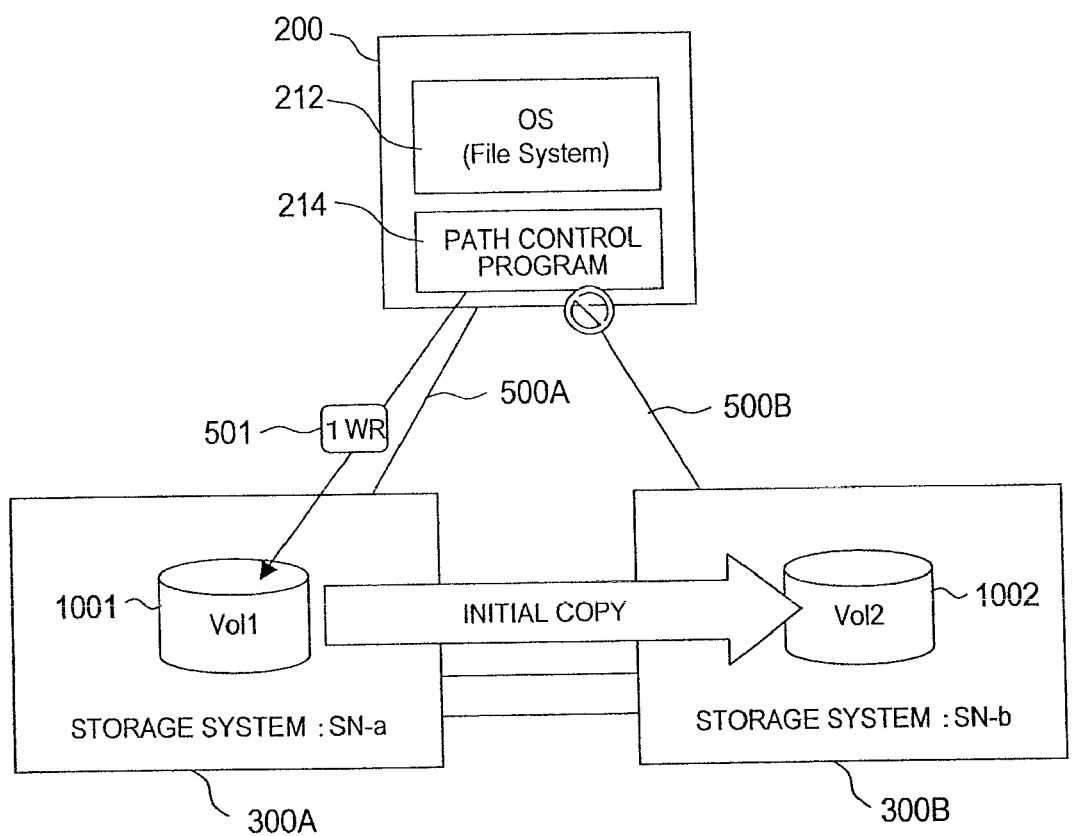
FIG. 4 is an explanatory diagram showing a volume access control process performed by the storage system according to the first embodiment of this invention.

FIG. 4 is an explanatory diagram showing a volume access control process performed by the storage system 300 according to the first embodiment of this invention.

According to this embodiment, the host computer 200 executes volume access control so as to always access the latest data alone. To be specific, when pieces of data of two logical volumes identified as identical logical volumes do not match each other, the host computer 200 accesses only one of the logical volumes that stores the latest data.

Three situations are conceivable where pieces of data in two logical volumes identified as identical logical volumes do not match each other.

The first situation occurs in the process of initial copy. The initial copy is a process executed immediately after a running start of the computer system in which bi-directional synchronous copy is executed. To be specific, the storage system 300 initially copies data of a logical volume being run in a logical volume of the other storage system 300. The initial copy process will be described below in detail with reference to FIG. 16.

During the initial copy, the host computer 200 suspends access to a logical volume of a copying destination (secondary volume). To be specific, the host computer 200 deactivates a path used for accessing the secondary volume by using a path control program 214, for not all the data is reflected in the secondary volume.

In this explanatory diagram, the storage system 300A initially copies data stored in a logical volume (primary volume) 1001 in a logical volume (secondary volume) 1002 of the storage system 300B.

During the initial copy, the host computer 200 suspends access to the logical volume 1002 of the storage system 300B. To be specific, the host computer 200 deactivates the path 500B used for accessing the logical volume 1002.

Accordingly, during the initial copy, the host computer 200 accesses the logical volume 1001 of the storage system 300A by using the path 500A which is not deactivated. In other words, the host computer 200 can access the latest date even during the initial copy.

A second situation occurs in the process of suspending bi-directional synchronous copy in accordance with an instruction from the management computer 100. The management computer 100 gives the host computer 200 an instruction for suspending access to one of the two logical volumes identified as identical logical volumes before giving the storage system 300 an instruction for suspending bi-directional synchronous copy.

Then, the host computer 200 suspends access to a requested logical volume. To be specific, the host computer 200 deactivates a path used for accessing the logical volume by using the path control program 214.

Subsequently, the management computer 100 gives the storage system 300 an instruction for suspending bi-directional synchronous copy. Upon reception of the instruction, the storage system 300 suspends the bi-directional synchronous copy.

Thus, the host computer 200 can access the latest data even when the bi-directional synchronous copy is suspended based on the instruction given by the management computer 100.

A third situation occurs when a fault occurs in the process of the bi-directional synchronous copy. It is presumed that a fault including a line trouble occurs during the bi-directional synchronous copy executed by the storage system 300.

The storage system 300 detects the fault. The storage system 300 that supplies one of the two logical volumes identified as identical logical volumes requests the host computer 200 to suspend access to the logical volumes. To be specific, upon reception of an I/O request for the logical volume, the storage system 300 notifies the host computer 200 of the path fault.

Upon reception of the notification of the path fault, the host computer 200 accesses the logical volume by using any path other than the fault-notified path.

Thus, the host computer 200 can access the latest data even when a fault occurs during the bi-directional synchronous copy.

Figure 5:
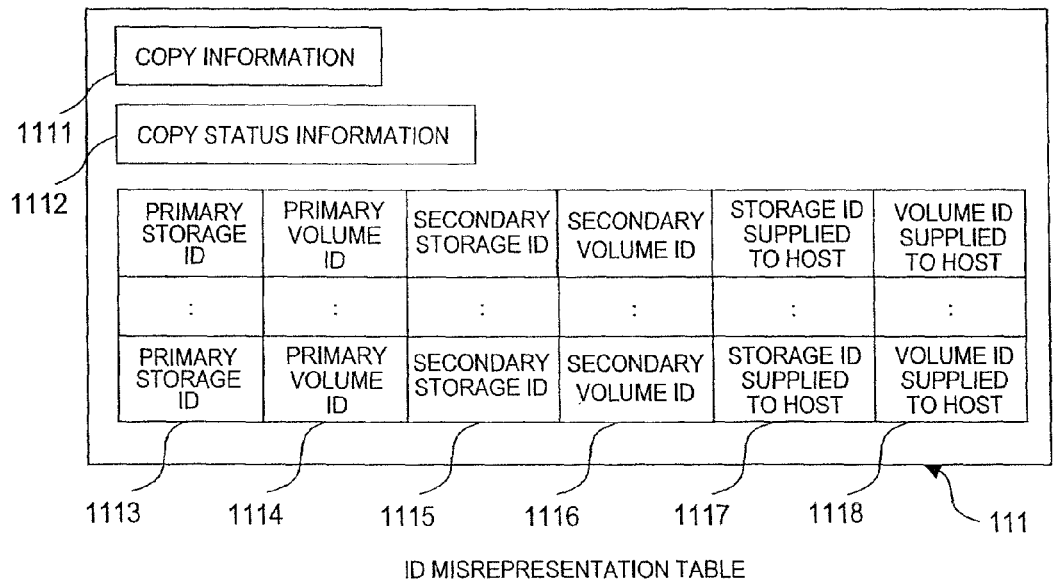
FIG. 5 is a diagram showing a structure of the ID misrepresentation management table stored in the management computer according to the first embodiment of this invention.

FIG. 5 is a diagram showing a structure of the ID misrepresentation management table 111 stored in the management computer 100 according to the first embodiment of this invention.

The ID misrepresentation management table 111 contains copy information 1111, copy status information 1112, and ID misrepresentation information.

The copy information 1111 includes a copy type and copy option information.

The copy type indicates which one of synchronous copying, asynchronous copying, bi-directional synchronous copy, and bi-directional asynchronous copy is executed for the logical volume managed by the ID misrepresentation management table 111. In this embodiment, the synchronous copying is stored as the copy type.

The copy option information indicates whether it is possible to write data in a logical volume identified by a secondary volume ID 1116 during suspension of the bi-directional synchronous copy. The suspension of the bi-directional synchronous copy means suspension of the bi-directional synchronous copy based on an instruction given by the management computer 100.

The copy status information 1112 indicates a current copying status in the logical volume managed by the ID misrepresentation management table 111. To be specific, the copy status information 1112 indicates which one of an initial copy status, a suspension status, a pair status, and an abnormal status corresponds to the copying status in the logical volume.

If the initial copy status is stored in the copy status information 1112, initial copy is being executed from a logical volume identified by a primary volume ID 1114 to a logical volume identified by a secondary volume ID 1116.

If the suspension status is stored in the copy status information 1112, the storage system 300 suspends the bi-directional synchronous copy. Thus, data of the logical volume identified by the primary volume ID 1114 does not match data of the logical volume identified by the secondary volume ID 1116.

If the pair status is stored in the copy status information 1112, data stored in the logical volume identified by the primary volume ID 1114 and data stored in the logical volume identified by the secondary volume ID 1116 are identical.

If the abnormal status is stored in the copy status information 1112, there is a fault in the line, the disk drive, or the like. Accordingly, the storage systems 300 cannot execute bi-directional synchronous copy.

The ID misrepresentation information includes a primary storage ID 1113, a primary volume ID 1114, a secondary storage ID 1115, a secondary volume ID 1116, a storage ID 1117 supplied to a host, and a volume ID 1118 supplied to the host.

The primary storage ID 1113 is a unique identifier of a storage system (primary storage system) 300 which supplies a logical volume of a copying source in initial copy. The primary volume ID 1114 is a unique identifier of the logical volume (primary volume) of the copying source in the initial copy.

The secondary storage ID 1115 is a unique identifier of a storage system (secondary storage system) 300 which supplies a logical volume of a copying destination in the initial copy. The secondary volume ID 1116 is a unique identifier of the logical volume (secondary volume) of the copying destination in the initial copy.

The storage ID 1117 supplied to the host is an identifier which enables the host computer 200 to identify the storage system 300 equipped with a primary volume and the storage system 300 equipped with a secondary volume.

The storage system 300 identified by the primary storage ID 1113 misrepresents its own identifier as the storage ID 1117 supplied to the host, and supplies the misrepresented identifier to the host computer 200. Similarly, the storage system 300 identified by the secondary storage ID 1115 misrepresents its own identifier as the storage ID 1117 supplied to the host, and supplies the misrepresented identifier to the host computer 200.

Accordingly, the host computer 200 identifies the storage system 300 having the logical volume identified by the primary volume ID 1114 and the storage system 300 having the logical volume identified by the secondary volume ID 1116, based on the storage ID 1117 supplied to the host.

The volume ID 1118 supplied to the host is an identifier which enables the host computer 200 to identify the primary volume and the secondary volume.

The storage system 300 identified by the primary storage ID 1113 misrepresents an identifier of the logical volume identified by the primary volume ID 1114 as the volume ID 1118 supplied to the host, and supplies the logical volume to the host computer 200. Similarly, the storage system 300 identified by the secondary storage ID 1115 misrepresents an identifier of the logical volume identified by the secondary volume ID 1115 as the volume ID 1118 supplied to the host, and supplies the logical volume to the host computer 200.

Accordingly, the host computer 200 identifies the logical volume identified by the primary volume ID 114 and the logical volume identified by the secondary volume ID 1116, based on the volume ID 1118 supplied to the host. As a result, the host computer 200 identifies the logical volumes identified by the primary volume ID 1114 and the secondary volume ID 1116 as being identical.

Figure 6:
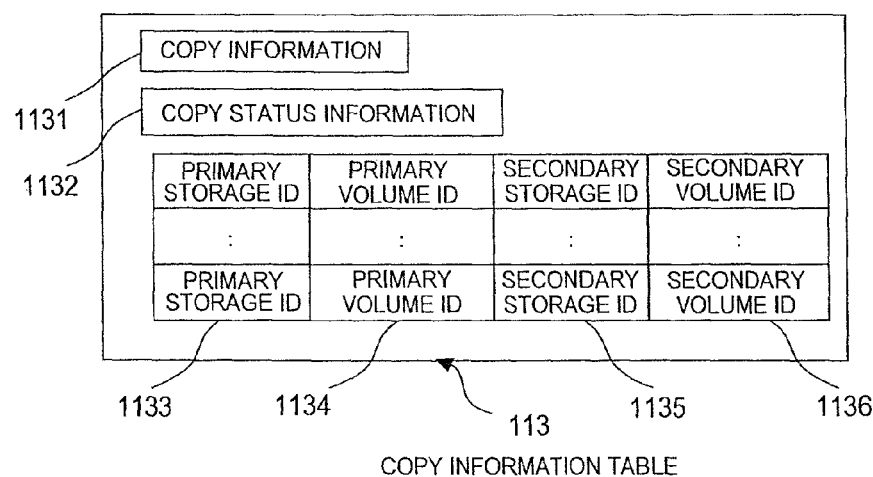
FIG. 6 is a diagram showing a structure of the copy information table stored in the management computer according to the first embodiment of this invention.

FIG. 6 is a diagram showing a structure of the copy information table 113 stored in the management computer 100 according to the first embodiment of this invention.

The copy information table 113 contains copy information 1131, copy status information 1132, and copy configuration information.

The copy information 1131 includes a copy type and copy option information. The copy type indicates which one of synchronous copying and asynchronous copying corresponds to the copying managed by the copy information table 113 is. The copy option information indicates whether it is possible to write data in the secondary volume during suspension of the bi-directional synchronous copy. The suspension of the bi-directional synchronous copy means suspension of the bi-directional synchronous copy based on an instruction given by the management computer.

The copy status information 1132 indicates a current copying status in the logical volume managed by the copy information table 113. To be specific, the copy status information 1132 indicates which one of an initial copy status, a suspension status, a pair status, and an abnormal status corresponds to the copying status managed by the copy information table 113.

The copy configuration information includes a primary storage ID 1133, a primary volume ID 1134, a secondary storage ID 1135, and a secondary volume ID 1136.

The primary storage ID 1133 is a unique identifier of a storage system (primary storage system) 300 which supplies a logical volume of a copying source in initial copy. The primary volume ID 1134 is a unique identifier of the logical volume (primary volume) of the copying source in the initial copy.

The secondary storage ID 1135 is a unique identifier of a storage system (secondary storage system) 300 which supplies a logical volume of a copying destination in the initial copy. The secondary volume ID 1136 is a unique identifier of the logical volume (secondary volume) of the copying destination in the initial copy.

Figure 7:
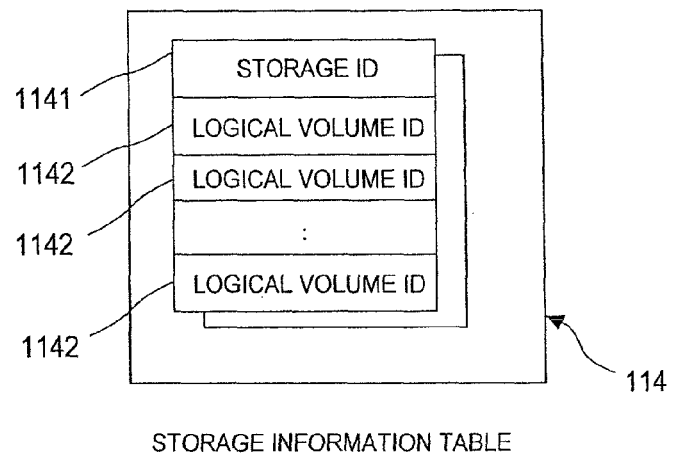
FIG. 7 is a diagram showing a structure of the storage information table stored in the management computer according to the first embodiment of this invention.

FIG. 7 is a diagram showing a structure of the storage information table 114 stored in the management computer 100 according to the first embodiment of this invention.

The storage information table 114 contains a storage ID 1141 and a logical volume ID 1142.

The storage ID 1141 is a unique identifier of a storage system 300 managed by the management computer 100. The logical volume ID 1142 is a unique identifier of the logical volume supplied by the storage system 300 identified by storage ID 1141.

Figure 8:
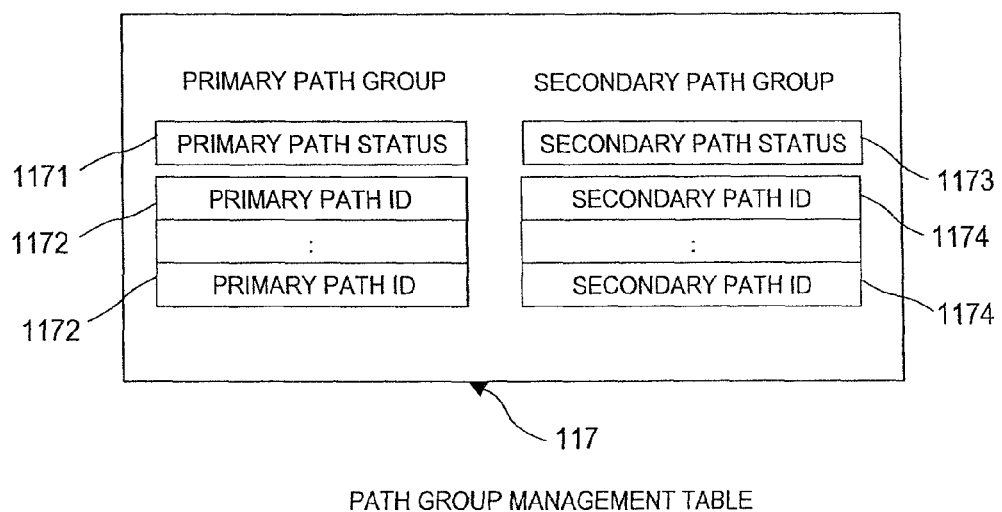
FIG. 8 is a diagram showing a structure of the path group management table stored in the management computer according to the first embodiment of this invention.

FIG. 8 is a diagram showing a structure of the path group management table 117 stored in the management computer 100 according to the first embodiment of this invention.

The path group management table 117 contains information regarding a primary path group and information regarding a secondary path group.

The information regarding the primary path group contains a primary path status 1171 and a primary path ID 1172.

The primary path ID 1172 is a unique identifier of a path (primary path) used for accessing a primary volume. The primary path status 1171 is a status of a path identified by the primary path ID 1172. To be specific, the primary path status 1171 indicates whether a primary volume can be accessed or not by using the path identified by the primary path ID 1172.

The information regarding the secondary path group contains a secondary path status 1173 and a secondary path ID 1174.

The secondary path ID 1174 is a unique identifier of a path (secondary path) used for accessing a secondary volume. The secondary path status 1173 is a status of a path identified by the secondary path ID 1174. To be specific, the secondary path status 1173 indicates whether a secondary volume can be accessed or not by using the path identified by the secondary path ID 1174.

Figure 9:
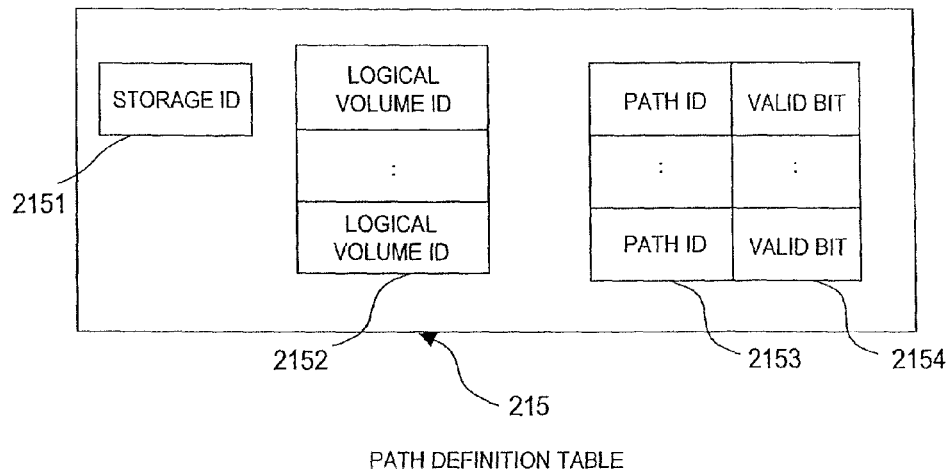
FIG. 9 is a diagram showing a structure of the path definition table stored in the host computer according to the first embodiment of this invention.

FIG. 9 is a diagram showing a structure of the path definition table 215 stored in the host computer 200 according to the first embodiment of this invention.

The path definition table 215 contains a storage ID 2151, a logical volume ID 2152, a path ID 2153, and a valid bit 2154.

The storage ID 2151 is a unique identifier of a storage system 300 that can be accessed by the host computer 200. The storage ID 2151 stores a storage ID misrepresented by the storage system 300.

The logical volume ID 2152 is a unique identifier of a logical volume supplied by the host computer 200 identified by the storage ID 2151. The logical volume ID 2152 stores a volume ID misrepresented by the storage system 300 and supplied to the host.

The path ID 2153 is a unique identifier of a path used for accessing the logical volume identified by the logical volume ID 2152. The valid bit 2154 indicates whether a path identified by a path ID 2153 of a relevant record is valid or not. In other words, the valid bit 2154 indicates whether the path identified by the path ID 2153 of the record is deactivateed or not.

Figure 10:
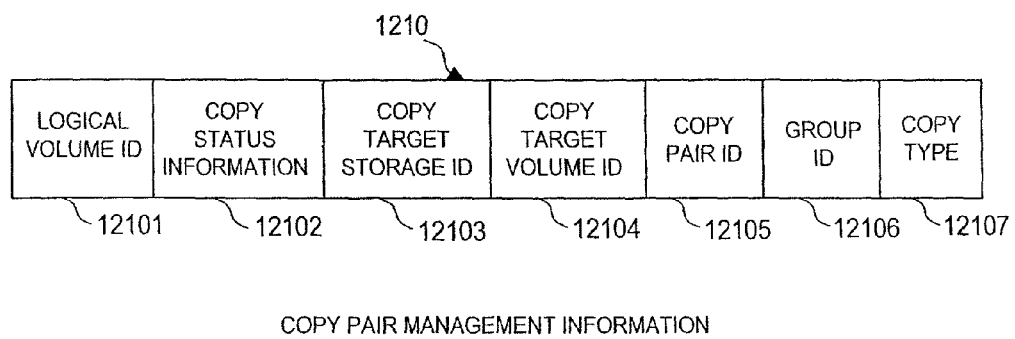
FIG. 10 is a diagram showing a structure of the copy pair management information stored in the storage system according to the first embodiment of this invention.

FIG. 10 is a diagram showing a structure of the copy pair management information 1210 stored in the storage system 300 according to the first embodiment of this invention.

The copy pair management information 1210 contains a logical volume ID 12101, copy status information 12102, a copy target storage ID 12103, a copy target volume ID 12104, a copy pair ID 12106, a copy group ID 12106, and a copy type 12107.

The logical volume ID 12101 is a unique identifier of a logical volume supplied by the storage system 300 which stores the copy pair management information 1210.

The copy status information 12102 indicates a current copy status for the logical volume identified by the logical volume ID 12101. To be specific, the copy status information 12101 indicates which one of a primary volume, a secondary volume, initial copy, suspension, and an abnormality corresponds to the logical volume identified by the logical volume ID 12101.

The copy target volume ID 12104 is a unique identifier of a logical volume making a copy pair with the logical volume identified by the logical volume ID 12101. In other words, the copy target volume ID 12104 is a unique identifier of a logical volume of a copying destination or a copying source of data stored in the logical volume identified by the logical volume ID 12101.

The copy target storage ID 12103 is a unique identifier of a storage system 300 which supplies the logical volume making the copy pair with the logical volume identified by the logical volume ID 12101. In other words, the copy target storage ID 12103 is a unique identifier of the storage system 300 which supplies the logical volume identified by the copy target volume ID 12104.

The copy pair ID 12105 is a unique identifier of the copy pair which includes the logical volume identified by the logical volume ID 12101 and the logical volume identified by the copy target volume ID 12104.

The copy group ID 12106 is a unique identifier of a copy group to which the copy pair identified by the copy pair ID 12105 belongs. The storage system 300 manages a copy group which includes one or more copy pairs. Accordingly, the management computer 100 can designate a copy group to instruct suspension, resumption or releasing of the operation of the bi-directional synchronous copy.

The copy type 12107 is a copy type executed by the copy pair identified by the copy pair ID 12105. To be specific, the copy type 12107 stores one selected from synchronous copying, asynchronous copying, bi-directional synchronous copy, and bi-directional asynchronous copy. The copy type 12107 of this embodiment stores bi-directional synchronous copy.

Figure 11:
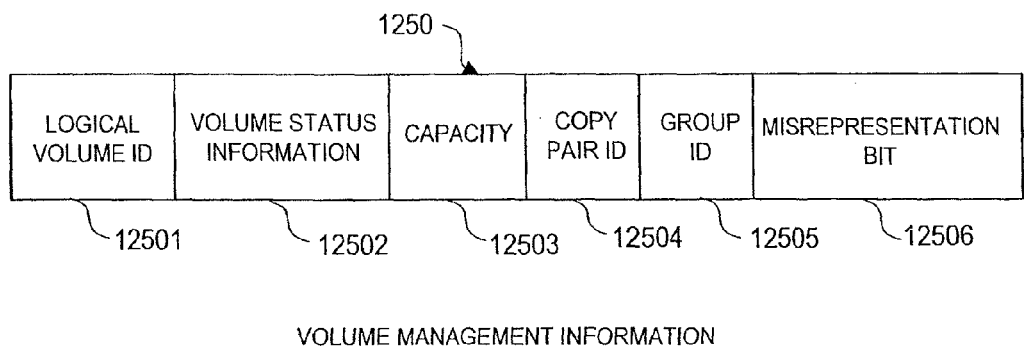
FIG. 11 is a diagram showing a structure of the volume management information stored in the storage system according to the first embodiment of this invention.

FIG. 11 is a diagram showing a structure of the volume management information 1250 stored in the storage system 300 according to the first embodiment of this invention.

The volume management information 1250 contains a logical volume ID 12501, volume status information 12502, a capacity 12503, a copy pair ID 12504, a copy group ID 12505, and a misrepresentation bit 12506.

The logical volume ID 12101 is a unique identifier of a logical volume supplied by the storage system 300 which stores the volume management information 1250.

The volume status information 12502 indicates a current copy status for the logical volume identified by the logical volume ID 12501. To be specific, the volume status information 12502 stores one selected from primary volume, secondary volume, normal, abnormal, ID misrepresent, and unused.

If the logical volume identified by the logical volume ID 12501 is a primary volume, "primary volume" is stored in the volume status information 12502. If the logical volume identified by the logical volume ID 12501 is a secondary volume, "secondary volume" is stored in the volume status information 12502.

If the host computer 200 can normally access the logical volume identified by the logical volume ID 12501, "normal" is stored in the volume status information 12502. If the host computer 200 cannot normally access the logical volume identified by the logical volume ID 12501, "abnormal" is stored in the volume status information 12502. For example, when a fault occurs in the disk drive 1500, in the initial copy, in the bi-directional synchronous copy, or the like, "abnormal" is stored in the volume status information 12502.

If the storage ID and the logical volume ID of the logical volume identified by the logical volume ID 12501 are misrepresented, "ID misrepresent" is stored in the volume status information 12502.

If no data is stored in the logical volume identified by the logical volume ID 12501, "unused" is stored in the volume status information 12502.

A capacity 12503 is a capacity of the logical volume identified by the logical volume ID 12501. The copy pair ID 12504 is a unique identifier of a copy pair including the logical volume identified by the logical volume ID 12501.

The group ID 12505 is a unique identifier of a copy pair identified by the copy pair ID 12504.

The misrepresentation bit 12506 indicates whether the storage ID and the logical volume ID are misrepresented or not when the logical volume identified by the logical volume ID 12501 is supplied.

Figure 12:
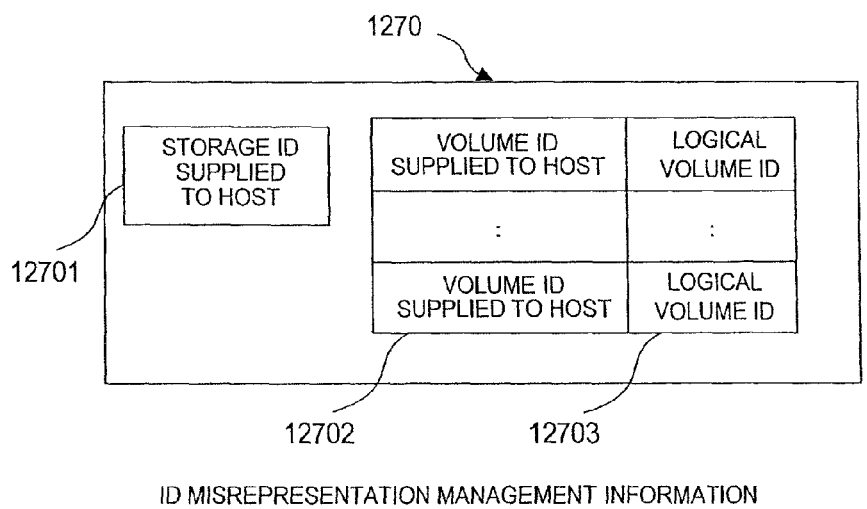
FIG. 12 is a diagram showing a structure of the ID misrepresentation management information stored in the storage system according to the first embodiment of this invention.

FIG. 12 is a diagram showing a structure of the ID misrepresentation management information 1270 stored in the storage system 300 according to the first embodiment of this invention.

The ID misrepresentation information 1270 contains a storage ID 12701 supplied to the host, a volume ID 12702 supplied to the host, and a logical volume ID 12703.

The storage ID 12701 supplied to the host is an identifier which enables the host computer 200 to identify the storage system 300. In other words, the storage system 300 misrepresents its identifier to the storage ID 12701 supplied to the host, and supplies a logical volume to the host computer 200. Thus, the host computer 200 identifies the storage system 300 based on the storage ID 12701 supplied to the host.

The logical volume ID 12703 is a unique identifier of a logical volume supplied by the storage system 300.

The volume ID 12704 supplied to the host is an identifier which enables the host computer 200 to identify a logical volume identified by a logical volume ID 12703 of a relevant record. In other words, the storage system 300 misrepresents an identifier of the logical volume to the volume ID 12704 supplied to the host, and supplies the logical volume to the host computer 200. Accordingly, the host computer 200 identifies the logical volume based on the volume ID 12702 supplied to the host.

Figure 13:
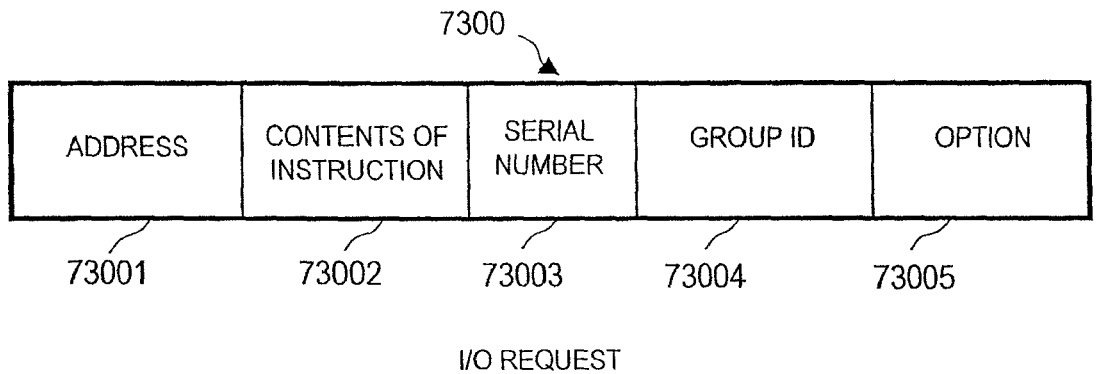
FIG. 13 is an explanatory diagram of an I/O request according to the first embodiment of this invention.

FIG. 13 is an explanatory diagram of an I/O request 7300 according to the first embodiment of this invention.

The I/O request 7300 is issued by the management computer 100 or the host computer 200.

The I/O request 7300 contains an address 73001, contents of instruction 73002, a serial number 73003, a group ID 73004, and an option 73005.

The address 73001 stores an identifier of a storage system 300 which becomes a transmission destination of the I/O request 7300, and an identifier of a logical volume. According to this embodiment, the address 73001 stores a storage ID supplied to the host, and a volume ID supplied to the host.

The contents of instruction 73002 are contents of a process instructed by the I/O request 7300. For example, the contents of instruction 73002 include a control instruction of remote-copying, or a data access instruction. To be specific, stored as a control instruction of remote-copying in the contents of instruction 73002 are a start, suspension, resumption, releasing, status acquisition, or the like. Stored as a data access instruction in the contents of instruction 73002 are writing or reading.

The serial number 73003 indicates the order in which the I/O requests 7300 were issued. Thus, the serial number 73003 is decided by the management computer 100 or the host computer 200 which is an issuance source of the I/O request 7300.

The group 73004 is a unique identifier of a copy group which is a target of processing to be performed by the I/O request 7300.

The option 73005 stores copy configuration information, option information for assisting the I/O request 7300, data requested to be written by the I/O request 7300, or the like. The copy configuration information contains a copy type, a storage ID of a copying destination, a logical volume ID of a copying destination, a storage ID of a copying source, and a logical volume ID of a copying source, and the like.

Figure 14:
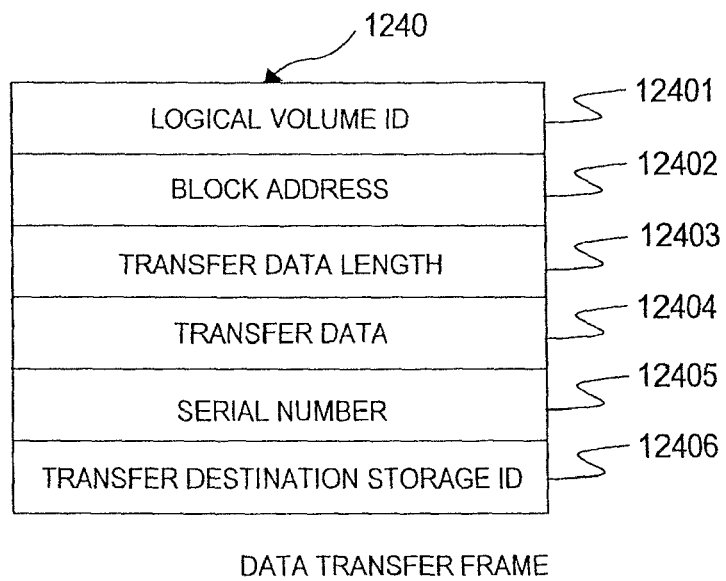
FIG. 14 is an explanatory diagram showing the data transfer frame according to the first embodiment of this invention.

FIG. 14 is an explanatory diagram showing the data transfer frame 1240 according to the first embodiment of this invention.

The storage system 300 having a logical volume of a copying source transmits the data transfer frame 1240 to the storage system 300 having a logical volume of a copying destination. The storage system 300 executes initial copy and synchronous copying by transmitting/receiving the data transfer frame 1240. To be specific, the data transfer frame 1240 contains a logical volume ID 12401, a block address 12402, a transfer data length 12403, transfer data 12404, a serial number 12405, and a transfer destination storage ID 12406.

The logical volume ID 12401 is a unique identifier of a logical volume which stores the transfer data 12404 contained in the transfer frame 1240. In other words, the logical volume ID 12401 is a unique identifier of a logical volume which becomes a copying destination of the transfer data 12404 contained in the transfer frame 1240.

The block address 12402 is a unique identifier of a block which stores the transfer data 12404 contained in the transfer frame 1240. The transfer data length 12403 is a size of the transfer data 12404 contained in the transfer frame 1240.

The transfer data 12404 is data transferred by the data transfer frame 1240. The serial number 12405 indicates the order in which the transfer frames 1240 were created.

The transfer destination storage ID 12406 is a unique identifier of the storage system 300 which becomes a transmission destination of the transfer frame 1240.

Figure 15:
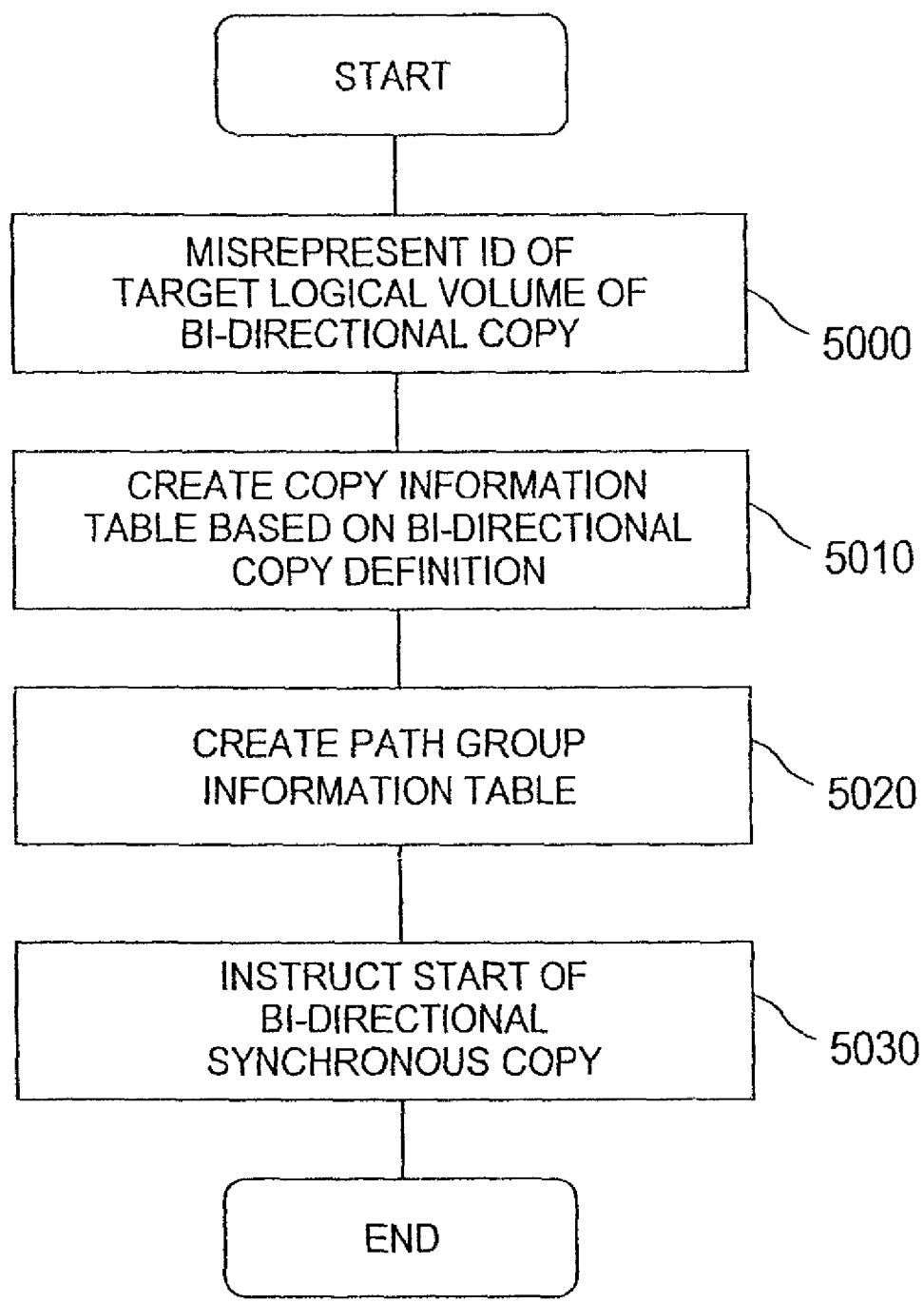
FIG. 15 is a flowchart showing an initial setting process of the computer system according to the first embodiment of this invention.

FIG. 15 is a flowchart showing an initial setting process of the computer system according to the first embodiment of this invention.

A user inputs an instruction of ID misrepresentation of a logical volume which is a bi-directional synchronous copy operation target to the management terminal 1600. At this time, the user designates a logical volume ID of the logical volume which is the bi-directional synchronous copy operation target. Additionally, the user designates a storage ID supplied to the host and a volume ID supplied to the host which are used when the logical volume is supplied. Then, an ID misrepresentation request containing the logical volume ID, the storage ID supplied to the host, and the volume ID supplied to the host, which have been designated, are transmitted by the management terminal 1600 to the storage controller 1000 of the storage system 300.

The storage controller 1000 receives the ID misrepresentation request from the management terminal 1600. Then, the storage controller 1000 extracts, from the received ID misrepresentation request, the logical volume ID, the storage ID supplied to the host, and the volume ID supplied to the host.

Next, the storage controller 1000 updates the ID misrepresentation management information 12703 based on the extracted information. To be specific, the extracted storage ID supplied to the host is stored in the storage ID 12701 supplied to the host in the ID misrepresentation management information 1270, by the storage controller 1000. Then, the extracted volume ID supplied to the host is stored in the volume ID 12702 supplied to the host in the ID misrepresentation management information 1270, by the storage controller 1000. Further, the extracted logical volume ID is stored in the logical volume ID 12703 of the ID misrepresentation management information 1270, by the storage controller 1000.

Subsequently, the storage controller 1000 misrepresents the ID of the logical volume by executing an ID misrepresentation program 1220 (5000). Thus, the host computer 200 can access the logical volume by using the storage ID supplied to the host and the volume ID supplied to the host. However, at this point in time, the storage controller 1000 prohibits the host computer 200 from accessing the ID-misrepresented logical volume.

According to this embodiment, the same storage ID supplied to the host and the same volume ID supplied to the host are given to the two logical volumes which become bi-directional synchronous copy targets. Thus, the host computer 200 recognizes the two logical volumes of the bi-directional synchronous copy targets as one logical volume.

Next, the user inputs a bi-directional synchronous copy definition to the management computer 100. The bi-directional synchronous copy definition is information stored in the copy information table 113. To be specific, the bi-directional synchronous copy definition contains a copy type, a primary storage ID, a primary volume ID, a secondary storage ID, and a secondary volume ID. Then, the management computer 100 creates a copy information table 113 based on the input bi-directional synchronous copy definition (5010).

According to this embodiment, the management computer 100 stores the bi-directional synchronous copy in copy information 1131 of the copy information table 113. Then an identifier of a logical volume (primary volume) of a copying source in initial copy is stored in a primary volume ID 1134 of the copy information table 113 by the management computer 100. The primary volume stores the latest data during the initial copy. A unique identifier of the storage system (primary storage system) 300 which supplies a logical volume identified by the primary volume ID 1134 is stored in a primary storage ID 1133 of the copy information table 113 by the management computer 100.

Next, an identifier of a logical volume (secondary volume) of a copying destination in the initial copy is stored in a secondary volume ID 1136 of the copy information table 113 by the management computer 100. A unique identifier of the storage system (secondary storage system) 300 which supplies a logical volume identified by the secondary volume ID 1136 is stored in a secondary storage ID 1135 of the copy information table 113 by the management computer 100.

Next, the user inputs a path definition to the management computer 100. The path definition is information stored in the path group management table 117. The management computer 100 creates a path group management table 117 based on the input path definition (5020).

To be specific, an identifier of a path (primary path) used for accessing a primary volume is stored in a primary path ID 1172 of the path group management table 117 by the management computer 100. The management computer 100 stores "access prohibited" in a primary path status 1171 of the path group management table 117 as access to the primary volume is not permitted at this time.

An identifier of a path (secondary path) used for accessing a secondary volume is stored in a secondary path ID 1174 of the path group management table 117 by the management computer 100. The management computer 100 stores "access prohibited" in a secondary path status 1173 of the path group management table 117 as access to the secondary volume is not permitted at this time.

Next, the management computer 100 transmits an I/O request 7300 for instructing a start of bi-directional synchronous copy to the primary storage system 300 identified by the primary storage ID 1133 of the copy information table 113 (5030). An option 73005 of the I/O request 7300 stores copy configuration information. The copy configuration information contains a copy type, a storage ID of a copying destination, a logical volume ID of the copying destination, a storage ID of a copying source, a logical volume of a copying source, and copy group ID to which a copy pair belongs.

In this case, the copy type is bi-directional synchronous copy. The storage ID of the copying destination is an identifier of the secondary storage system 300. The logical volume ID of the copying destination is an identifier of the secondary volume. The storage ID of the copying source is an identifier of the primary storage system 300. The logical volume ID of the copying source is an identifier of the primary volume.

Upon reception of the I/O request 7300 for instructing a start of bi-directional synchronous copy, the primary storage system 300 starts an initial copy process. The initial copy process executed by the storage system 300 will be described below in detail with reference to FIG. 16.

Then, the host computer finishes the initial setting process.

Figure 16:
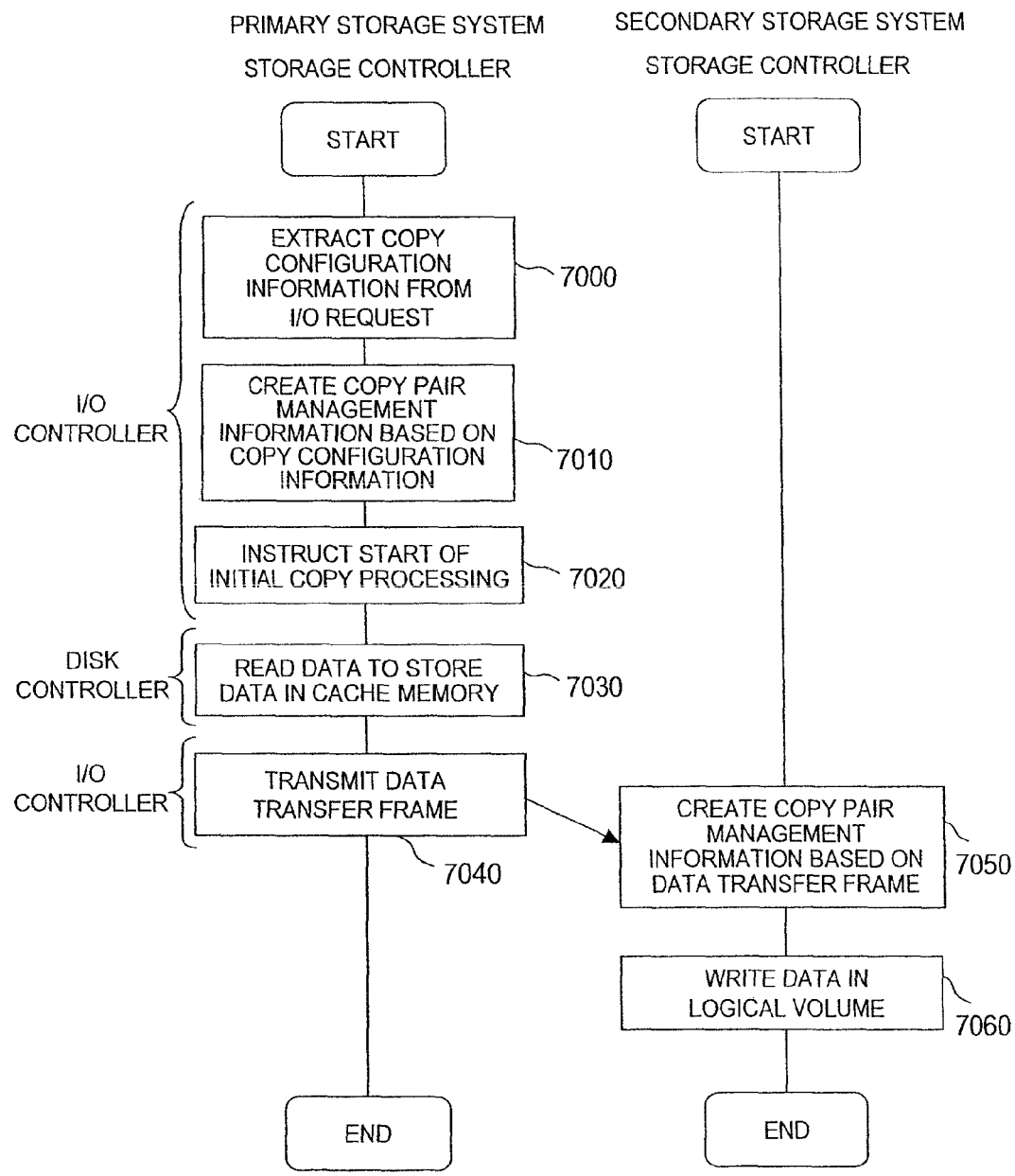
FIG. 16 is a flowchart showing the initial copy process executed by the storage system according to the first embodiment of this invention.

FIG. 16 is a flowchart showing the initial copy process executed by the storage system 300 according to the first embodiment of this invention.

Upon reception of the I/O request for instructing a start of bi-directional synchronous copy, the I/O controller 1300 of the primary storage system 300 starts an initial copy process.

First, the I/O controller 1300 of the primary storage system 300 extracts copy configuration information from the option 73005 of the received I/O request 7300 (7000).

Then, the I/O controller 1300 of the primary storage system 300 creates copy pair management information 1210 based on the extracted copy configuration information (7010).

To be specific, the I/O controller 1300 of the primary storage system 300 stores "ongoing initial copy" in copy status information 1202 of the copy pair management information 1210. The I/O controller 1300 of the primary storage system 300 stores a logical volume ID of a copying source contained in the extracted copy configuration information in a logical volume ID 12101 of the copy pair management information 1210.

Next, a storage ID of a copying destination contained in the extracted copy configuration information is stored in a copy target storage ID 12103 of the copy pair management information 1210 by the I/O controller 1300 of the primary storage system 300. A logical volume of the copying destination contained in the extracted copy configuration information is stored in a copy target volume ID 12104 of the copy pair management information 1210 by the I/O controller 1300 of the primary storage system 300.

The I/O controller 1300 of the primary storage system 300 stores a unique value in a copy pair ID 12105 of the copy pair management information 1210. A copy group ID contained in the extracted copy configuration information is stored in a copy group ID 12106 of the copy pair management information 1210 by the I/O controller 1300 of the primary storage system 300. A copy type contained in the extracted copy configuration information is stored in a copy type 12107 of the copy pair management information 1210 by the I/O controller 1300 of the primary storage system 300.

Next, the I/O controller 1300 of the primary storage system 300 instructs a start of an initial copy process to a disk controller 1400 of the primary storage system 300 (7020).

Then, the disk controller 1400 of the primary storage system 300 reads data from a logical volume identified by the logical volume ID 12101 of the copy pair management information 1210. The disk controller 1400 of the primary storage system 300 stores the read data in a cache memory 1100 (7030).

The disk controller 1400 of the primary storage system 300 notifies the I/O controller 1300 of the primary storage system 300 of an address of a block from which the data has been read, a data length of the read data, and an address in the cache memory in which the data has been stored.

Then, the I/O controller 1300 of the primary storage system 300 creates a data transfer frame 1240 (shown in FIG. 14) based on the information notified by the disk controller 1400 of the primary storage system 300 and on the copy pair management information 1210.

To be specific, the I/O controller 1300 of the primary storage system 300 stores a copy target storage ID 12103 of the copy pair management information 1210 in a logical volume ID 12401 of the data transfer frame 1240. Then, the block address notified by the disk controller 1400 is stored in a block address 12402 of the data transfer frame 1240 by the I/O controller 1300 of the primary storage system 300.

Next, the data length notified by the disk controller 1400 is stored in a transfer data length 12403 of the data transfer frame 1240 by the I/O controller 1300 of the primary storage system 300. Then, a part or all of the data stored in the cache memory 1100 is stored in transfer data 12404 of the data transfer frame 1240 by the I/O controller 1300 of the primary storage system 300.

The I/O controller 1300 of the primary storage system 300 stores a creating sequence of the data transfer frames 1240 in the initial copy in the serial number 12405 of the data transfer frame 1240. The I/O controller 1300 of the primary storage system 300 stores the copy target storage ID 12103 of the copy pair management information 1210 in the transfer destination storage ID 12406 of the data transfer frame 1240.

The I/O controller 1300 of the primary storage system 300 transmits the created data transfer frame 1240 to the secondary storage system 300 (7040).

Then, the I/O controller 1300 of the secondary storage system 300 receives the data transfer frame 1240. The I/O controller 1300 of the secondary storage system 300 generates copy pair management information 1210 based on the received data transfer frame 1240 or the like (7050).

To be specific, the I/O controller 1300 of the secondary storage system 300 stores a logical volume ID 12401 of the received data transfer frame 1240 in the logical volume ID 12101 of the copy pair management information 1210. The I/O controller 1300 of the secondary storage system 300 stores "ongoing initial copy" in the copy status information 12102 of the copy pair management information 1210.

The I/O controller 1300 of the secondary storage system 300 stores an identifier of the primary storage system 300 which is a transmission source of the received data transfer frame 1240 in the copy target storage ID 12103 of the copy pair management information 1210. The I/O controller 1300 of the secondary storage system 300 stores an identifier of a primary volume in which the transfer data 12404 of the data transfer frame 1240 is stored in the copy target volume ID 12104 of the copy pair management information 1210.

The I/O controller 1300 of the secondary storage system 300 stores "bi-directional synchronous copy" in the copy type 12107 of the copy pair management information 1210.

The I/O controller 1300 of the secondary storage system 300 writes the transfer data 12404 of the data transfer fame 1240 in a logical volume identified by the logical volume ID 12401 of the data transfer frame 1240 (7060).

The primary storage system 300 and the secondary storage system 300 store all data of the primary volume in the secondary volume by repeatedly executing the steps 7030 to 7060.

Then, the primary storage system 300 and the secondary storage system 300 finish the initial copy process. Upon the end of the initial copy, the primary storage system 300 stores "primary volume" in the copy status information 12102 of the copy pair management information 1210. The secondary storage system 300 stores "secondary volume" in the copy status information 12102 of the copy pair management information 1210.

Figure 17:
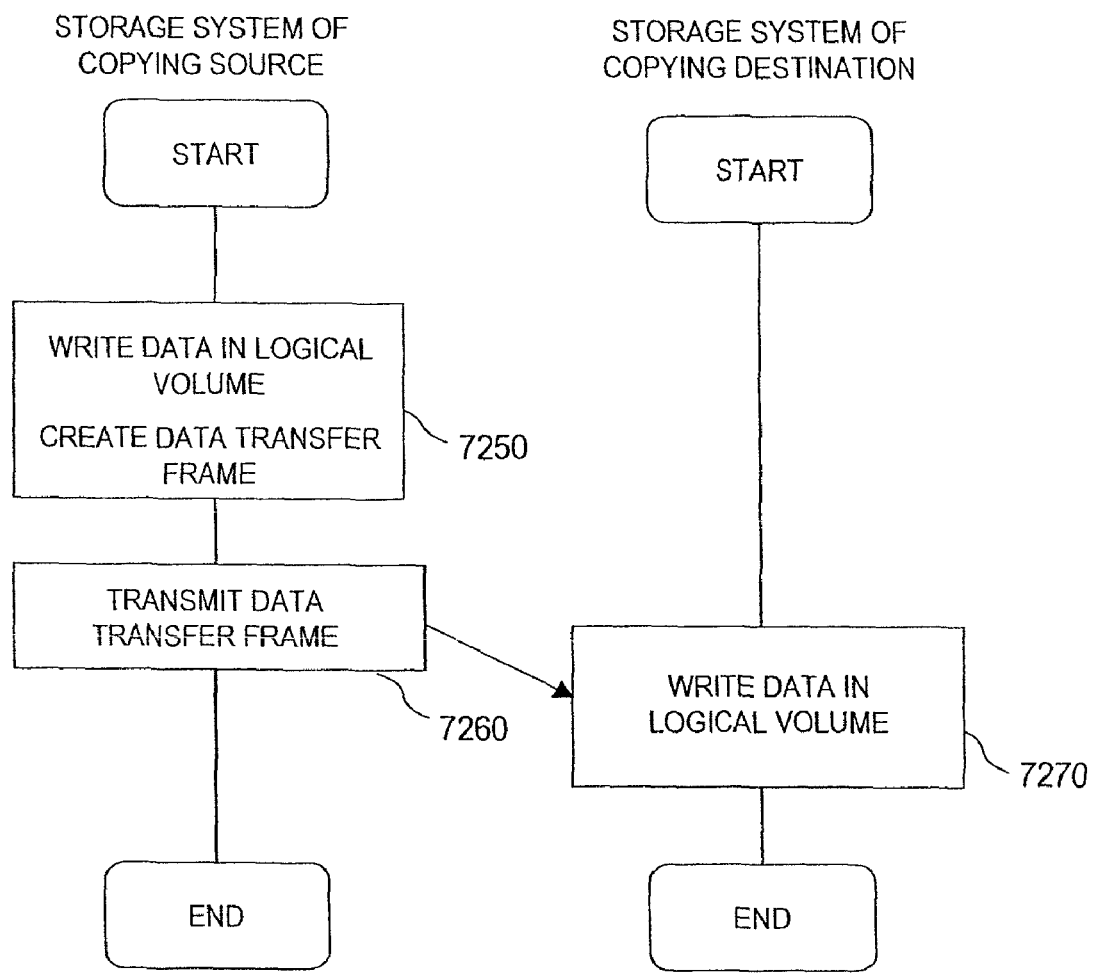
FIG. 17 is a flowchart of a bi-directional synchronous copy process executed by the storage system according to the first embodiment of this invention.

FIG. 17 is a flowchart of a bi-directional synchronous copy process executed by the storage system 300 according to the first embodiment of this invention.

Upon the end of the initial copy process, the storage system 300 starts a bi-directional synchronous copy operation. In other words, the storage system 300 starts the bi-directional synchronous copy operation after data of the primary volume and the secondary volume match each other.

To be specific, upon reception of a writing request after the end of the initial copy process, the storage system 300 executes the bi-directional synchronous copy process. For example, after writing of data in the primary volume, the primary storage system 300 writes the write data in the secondary volume. Similarly, after writing of data in the secondary volume, the secondary storage system 300 writes the write data in the primary volume.

It should be noted that for the bi-directional synchronous copy process, one storage system 300 can be a copying source or a copying destination. According to this embodiment, the storage system 300 that has received the I/O request from the host computer 200 is set as a storage system 300 of a copying source. Another storage system 300 is then set as a storage system 300 of a copying destination.

The storage system 300 of the copying source receives the I/O request 7300. The I/O request 7300 is a writing request. Then, the storage system 300 of the copying source extracts data (write data) requested to be written from the option 73005 of the I/O request 7300. The storage system 300 of the copying source extracts a storage ID supplied to the host and a volume ID supplied to the host from the address 73001 of the I/O request 7300.

The storage system 300 of the copying source specifies a logical volume in which the data is requested to be written.

To be specific, the storage system 300 of the copying source selects ID misrepresentation management information 1270 in which the extracted storage ID supplied to the host matches the storage ID 12701 supplied to the host in the ID misrepresentation management information 1270. The storage system 300 of the copying source selects a record in which the extracted volume ID supplied to the host matches the volume ID 12703 supplied to the host from the selected ID misrepresentation management information 1270.

The storage system 300 of the copying source extracts a logical volume ID 12703 from the selected record. The storage system 300 of the copying source specifies a logical volume identified by the extracted logical volume ID 12703 as a logical volume in which the data is requested to be written.

The storage system of the copying source writes the extracted write data in the logical volume identified by the extracted logical volume ID 12703.

The storage system 300 of the copying source creates the data transfer frame 1240 (7250).

To be specific, the storage system 300 of the copying source selects the copy pair management information 1210 in which the extracted logical volume ID 12703 matches the logical volume ID 12101 of the copy pair management information 1210. The storage system 300 of the copying source extracts the copy target storage ID 12103 and the copy target volume ID 12104 from the selected copy pair management information 1210.

The storage system 300 of the copying source stores the extracted copy target volume ID 12104 in the logical volume ID 12401 of the data transfer frame 1240. The storage system 300 of the copying source stores an address of a block in which the write data has been stored in the block address 12402 of the data transfer frame 1240.

The storage system 300 of the copying source stores a size of the write data in a transfer data length 12403 of the data transfer frame 1240. The storage system 300 of the copying source stores a part or all of the write data in the transfer data 12404 of the data transfer frame 1240.

The storage system 300 of the copying source stores the order in which the transfer frames 1240 were created, in the bi-directional synchronous copy in the serial number 12405 of the data transfer frame 1240. The storage system 300 of the copying source stores the extracted copy target storage ID 12103 in the transfer destination storage ID 12406 of the data transfer frame 1240.

The storage system 300 of the copying source transmits the created data transfer frame 1240 to the storage system 300 of the copying destination (7260).

The storage system 300 of the copying destination receives the data transfer frame 1240. The storage system 300 of the copying destination writes transfer data 12404 of the data transfer frame 1240 in a logical volume identified by the logical volume ID 12401 of the data transfer frame 1240 (7270).

Then, the storage system 300 finishes the bi-directional synchronous copy for one I/O request.

Next, an access control process to the logical volume by the management computer 100 will be described.

First, an access control process before completion of the initial copy will be described. The management computer 100 controls access to the logical volume by using one of a first access control process (FIG. 18) and a second access control process (FIG. 19) before the completion of the initial copy.

Figure 18:
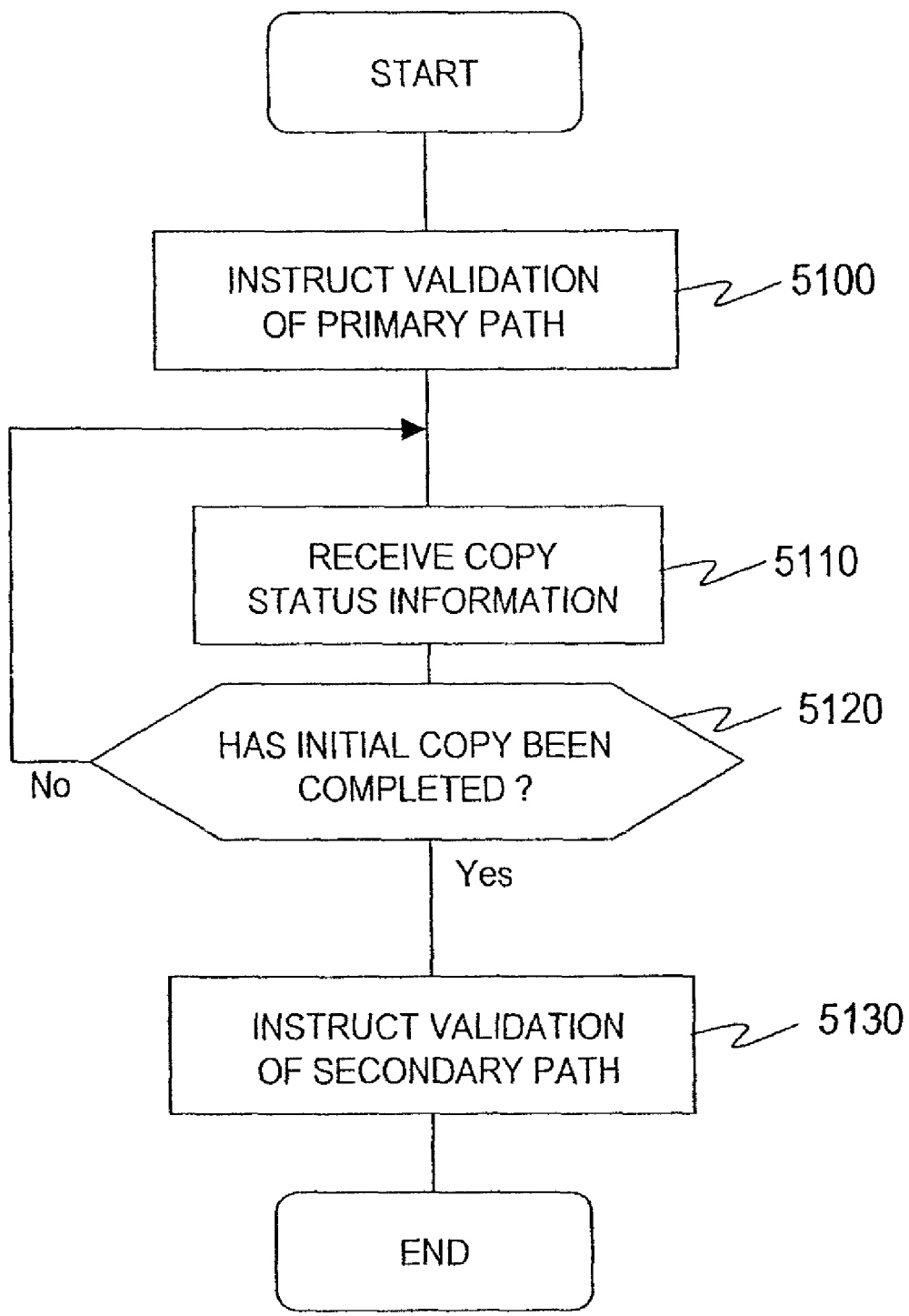
FIG. 18 is a flowchart showing the first access control process before the completion of the initial copy executed by the management computer according to the first embodiment of this invention.

FIG. 18 is a flowchart showing the first access control process before the completion of the initial copy executed by the management computer 100 according to the first embodiment of this invention.

First, the management computer 100 instructs validation of the primary path to the host computer 200 before the I/O request 7300 for instructing the start of bi-directional synchronous copy is transmitted (before execution of step 5030 of FIG. 15) (5100). In other words, the management computer 100 permits access only to the primary volume.

The host computer 200 selects a record in which an identifier of the primary path instructed to be validated matches a path ID 2153 of the path definition table 215 from the path definition table 215. The host computer 200 stores a value indicating that the path is valid in a valid bit 2154 of the selected record. Accordingly, the host computer 200 validates the primary path.

Then, the management computer 100 stores "access permitted" in the primary path status 1171 of the path group management table 117.

The management computer 100 transmits the I/O request 7300 for instructing the start of the bi-directional synchronous copy.

Then, the management computer 100 transmits the I/O request 7300 for obtaining copy status information to the primary storage system 300. The primary storage system 300 receives the I/O request 7300 for obtaining the copy status information. Then, the primary storage system 300 extracts copy status information 12102 from the copy pair management information 1210. The primary storage system 300 transmits the extracted copy status information 12102 to the management computer 100.

The management computer 100 receives the copy status information 12102 (5110). The management computer 100 judges whether or not the initial copy of the storage system 300 has been completed (5120). To be specific, if there is "ongoing initial copy" stored in the received copy status information 12102, the management computer 100 judges that the initial copy has not been completed. On the other hand, if there is no "ongoing initial copy" stored in the received copy status information 12102 ("primary volume" has been stored), the management computer 100 judges that the initial copy has been completed.

If the initial copy has not been completed, data of the primary volume and that of the secondary volume do not match each other. Thus, the management computer 100 stands by until the initial copy is completed. The management computer 100 returns to the step 5110.

On the other hand, if the initial copy has been completed, data of the primary volume and that of the secondary volume match each other. Thus, the management computer 100 instructs validation of a secondary path to the host computer 200 (5130). In other words, after the completion of the initial copy, the management computer 100 permits access to the secondary volume.

The host computer 200 selects a record in which an identifier of the secondary path instructed to be validated matches a path ID 2153 of the path definition table 215 from the path definition table 215. The host computer 200 stores a value indicating that the path is valid in the valid bit 2154 of the selected record. Accordingly, the host computer 200 validates the secondary path.

Then, the management computer 100 stores "access permitted" in a secondary path status 1173 of the path group management table 117. The management computer 100 finishes the first access control process before the completion of the initial copy.

As described above, the management computer 100 validates the primary path alone before the completion of the initial copy. In other words, access only to the primary volume is permitted before the completion of the initial copy. After the completion of the initial copy, the management computer 100 validates the secondary path. In other words, after the completion of the initial copy, the management computer 100 permits access to the secondary volume.

According to the first access control process before the completion of the initial copy, the host computer 200 can access the logical volume even during the initial copy. Thus, the host computer 200 can execute AP 211 promptly.

Figure 19:
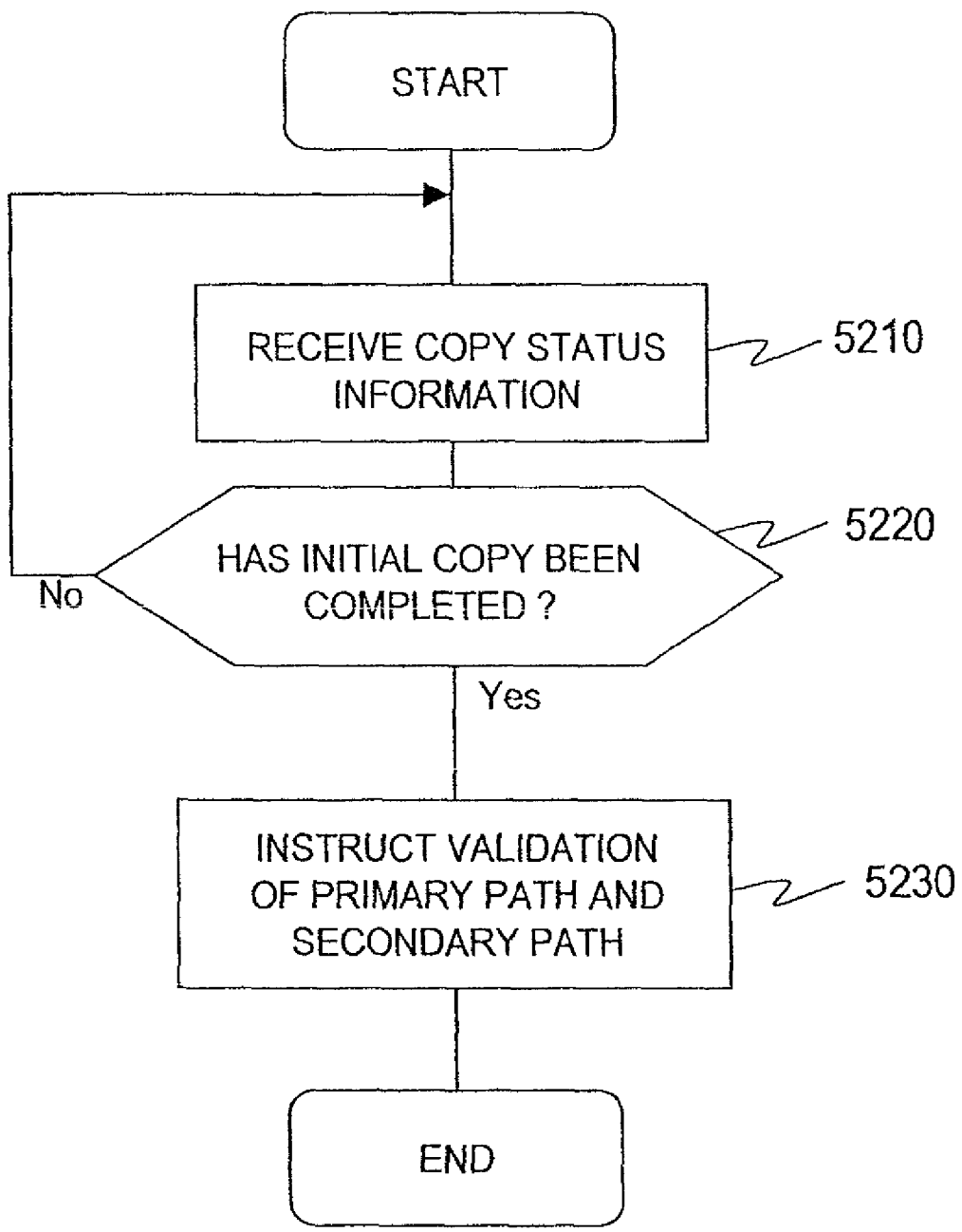
FIG. 19 is a flowchart showing the second access control process before the completion of the initial copy executed by the management computer according to the first embodiment of this invention.

FIG. 19 is a flowchart showing the second access control process before the completion of the initial copy executed by the management computer 100 according to the first embodiment of this invention.

Upon transmission of the I/O request 7300 for instructing the start of bi-directional synchronous copy in the step 5030 of FIG. 15, the management computer 100 executes the second access control process before the completion of the initial copy.

First, the management computer 100 transmits the I/O request 7300 for obtaining copy status information to the primary storage system 300. The primary storage system 300 receives the I/O request 7300 for obtaining the copy status information. Then, the primary storage system 300 extracts copy status information 12102 from the copy pair management information 1210. The primary storage system 300 transmits the extracted copy status information 12102 to the management computer 100.

The management computer 100 receives the copy status information 12102 (5210). The management computer 100 then judges whether or not the initial copy of the storage system 300 has been completed (5220). To be specific, if there is "ongoing initial copy" stored in the received copy status information 12102, the management computer 100 judges that the initial copy has not been completed. On the other hand, if there is no "ongoing initial copy" stored in the received copy status information 12102 ("primary volume" has been stored), the management computer 100 judges that the initial copy has been completed.

If the initial copy has not been completed, data of the primary volume and that of the secondary volume do not match each other. Thus, the management computer 100 stands by until the initial copy is completed. The management computer 100 returns to the step 5210.

On the other hand, if the initial copy is completed, data of the primary volume and that of the secondary volume match each other. Thus, the management computer 100 instructs validation of the primary path and the secondary path to the host computer 200 (5230). In other words, after the completion of the initial copy, the management computer 100 permits access to the primary volume and the secondary volume.

The host computer 200 selects a record in which an identifier of the primary path instructed to be validated matches the path ID 2153 of the path definition table 215 from the path definition table 215. The host computer 200 stores a value indicating that the path is valid in the valid bit 2154 of the selected record. Accordingly, the host computer 200 validates the primary path.

Similarly, the host computer 200 selects a record in which an identifier of the secondary path instructed to be validated matches the path ID 2153 of the path definition table 215 from the path definition table 215. The host computer 200 stores a value indicating that the path is valid in the valid bit 2154 of the selected record. Accordingly, the host computer 200 validates the secondary path.

Then, the management computer 100 stores "access permitted" in the primary path status 1171 and the secondary path status 1173 of the path group management table 117. The management computer 100 finishes the second access control process before the completion of the initial copy.

As described above, the management computer 100 deactivates the primary path and the secondary path before the completion of the initial copy. In other words, access to the primary volume and the secondary volume is prohibited until the completion of the initial copy. After the completion of the initial copy, the management computer 100 validates the primary path and the secondary path. In other words, after the completion of the initial copy, the management computer 100 permits access to the primary volume and the secondary volume.

Next, an access control process when bi-directional synchronous copy is suspended or resumed will be described.

Figure 20:
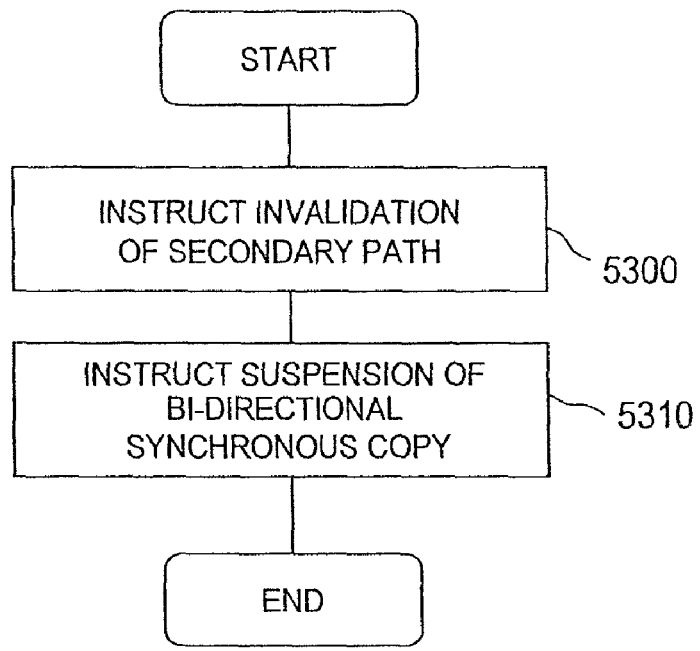
FIG. 20 is a flowchart showing the access control process when bi-directional synchronous copy is suspended based on an instruction from the management computer according to the first embodiment of this invention.

FIG. 20 is a flowchart showing the access control process when bi-directional synchronous copy is suspended based on an instruction from the management computer 100 according to the first embodiment of this invention.

When it is necessary to suspend the bi-directional synchronous copy, the management computer 100 instructs invalidation of a secondary path to the host computer 200 (5300). In other words, the management computer 100 inhibits access to the secondary volume. This is because when bi-directional synchronous copy is suspended, data of the primary volume and that of the secondary volume no longer match each other.

The host computer 200 receives the instruction to invalidate the secondary path. Then, the host computer 200 selects a record in which an identifier of the secondary path instructed to be invalidated matches the path ID 2153 of the path definition table 215 from the path definition table 215. The host computer 200 stores a value indicating that the path is invalid in the valid bit 2154 of the selected record. Accordingly, the host computer 200 invalidates the secondary path.

The management computer 100 stores "access inhibited" in the secondary path status 1173 of the path group management table 117.

The management computer 100 transmits the I/O request 7300 for suspending the bi-directional synchronous copy to the primary storage system 300. Accordingly, the management computer 300 instructs suspension of the bi-directional synchronous copy to the primary storage system 300 (5310).

Upon reception of the instruction, the primary storage system 300 suspends the bi-directional synchronous copy. Then, the primary storage system 300 stores "suspending" in the copy status information 1202 of the copy pair management information 1210.

The management computer 100 finishes the access control process during suspension of the bi-directional synchronous copy based on the instruction from the management computer 100.

As described above, during suspension of the bi-directional copy, the management computer 100 instructs invalidation of the secondary path to the host computer 200. In other words, during suspension of the bi-directional synchronous copy, the management computer 100 inhibits access to the secondary volume.

It should be noted that the management computer 100 may instruct invalidation of the primary path instead of the secondary path during suspension of the bi-directional synchronous copy. In other words, when it is necessary to suspend the bi-directional synchronous copy, the management computer 100 instructs invalidation of one of the primary path and the secondary path to the host computer 200.

Figure 21:
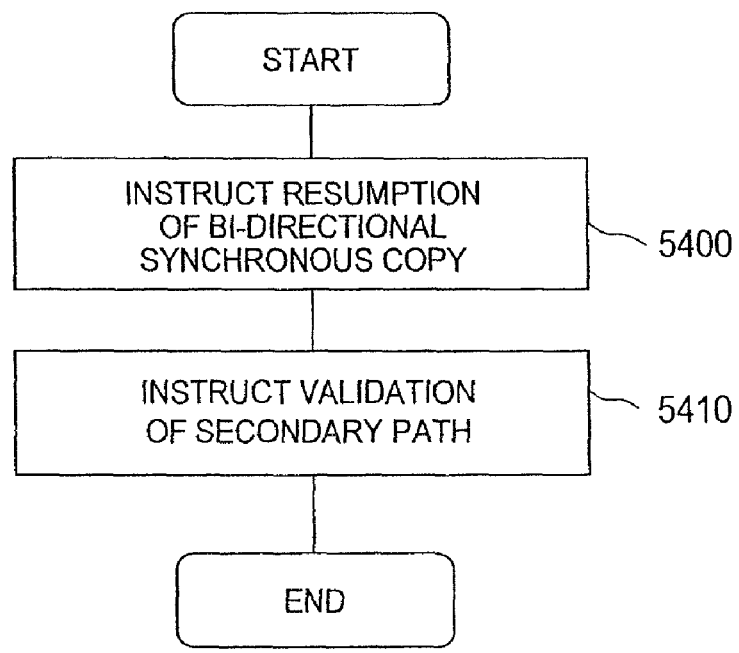
FIG. 21 is a flowchart showing the access control process when bi-directional synchronous copy is resumed based on the instruction from the management computer according to the first embodiment of this invention.

FIG. 21 is a flowchart showing the access control process when bi-directional synchronous copy is resumed based on the instruction from the management computer 100 according to the first embodiment of this invention.

When it is necessary to resume the suspended bi-directional synchronous copy, the management computer 100 transmits the I/O request 7300 for resuming the bi-directional synchronous copy to the primary storage system 300. Accordingly, the management computer 100 instructs resumption of the bi-directional synchronous copy to the primary storage system 300 (5400).

Upon reception of the resumption instruction, the primary storage system 300 resumes the suspended bi-directional synchronous copy. Then, the primary storage system 300 stores "primary volume" in the copy status information 12102 of the copy pair management information 1210. Accordingly, data of the primary volume and that of the secondary volume match each other.

Next, the management computer 100 instructs validation of the secondary path to the host computer 200 (5410). In other words, the management computer 100 permits access to the secondary volume.

The host computer 200 selects a record in which an identifier of the secondary path instructed to be validated matches the path ID 2153 of the path definition table 215 from the path definition table 215. The host computer 200 stores a value indicating that the path is valid in the valid bit 2154 of the selected record. Accordingly, the host computer 200 validates the secondary path.

Then, the management computer 100 stores "access permitted" in the secondary path status 1173 of the path group management table 117. The management computer 100 finishes the access control process when resuming the bi-directional synchronous copy.

As described above, after the resumption of the bi-directional synchronous copy, the management computer 100 instructs validation of the secondary path to the host computer 200. In other words, after the resumption of the bi-directional synchronous copy, the management computer 100 permits access to the primary volume and the secondary volume.

When the primary path is invalidated during suspension of the bi-directional synchronous copy, the management computer 100 instructs validation of the primary path instead of the secondary path. In other words, the management computer 100 instructs validation of the path invalidated during suspension of the bi-directional synchronous copy to the host computer 200.

Figure 22:
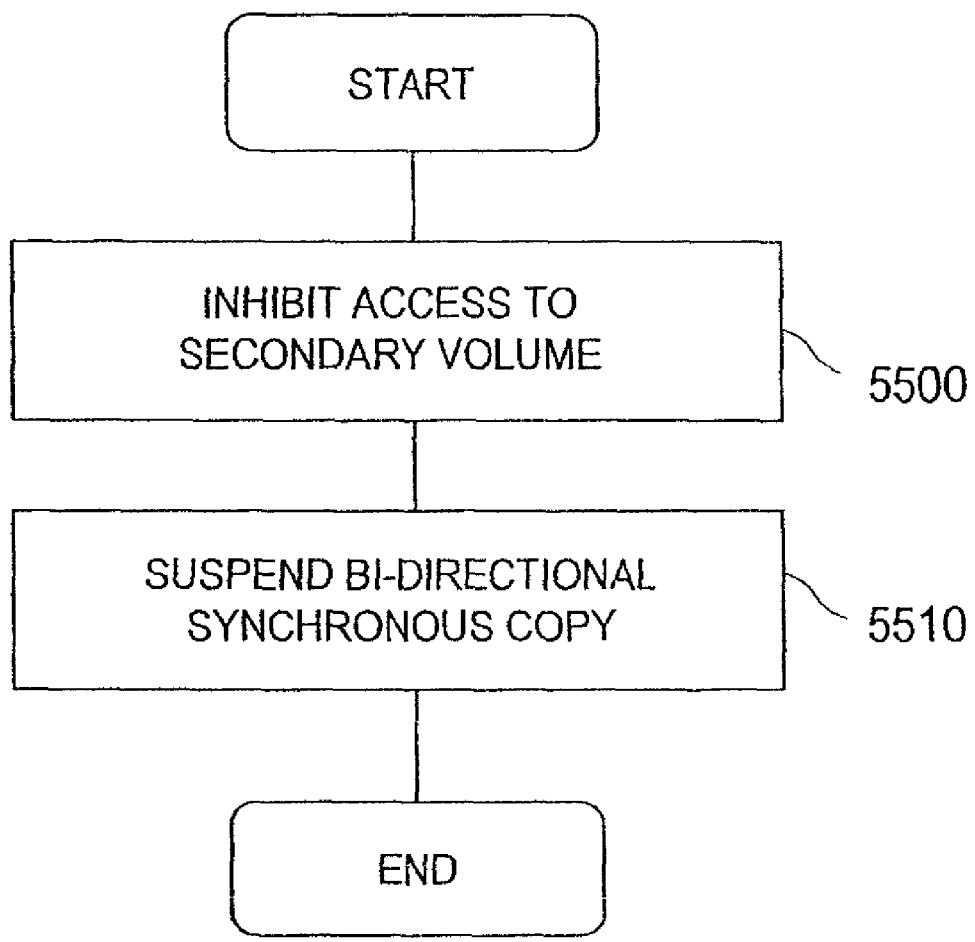
FIG. 22 is a flowchart showing the access control process when the bi-directional synchronous copy is suspended based on the instruction from the storage system according to the first embodiment of this invention.

FIG. 22 is a flowchart showing the access control process when the bi-directional synchronous copy is suspended based on the instruction from the storage system 300 according to the first embodiment of this invention.

When a fault occurs in the line for connecting the secondary storage system 300 and the primary storage system 300, the secondary storage system 300 judges that it is necessary to suspend the bi-directional synchronous copy. Then, the secondary storage system 300 inhibits access from the host computer 200 to the secondary volume (5500). This is because when the bi-directional synchronous copy is suspended, the data of the primary volume and that of the secondary volume no longer match each other.

To be specific, the secondary storage system 300 selects volume management information 1250 in which "secondary volume" is stored in the volume status information 12502. Then, the secondary storage system 300 selects the volume management information 1250 having a value indicating misrepresentation stored in the misrepresentation bit 12506 from the selected volume management information 1250.

Accordingly, the secondary storage system 300 specifies the logical volume identified by the logical volume ID 12101 of the selected volume management information 1250 as the secondary volume.

The secondary storage system 300 stores "abnormal" in the volume status information 12502 of the selected management information 1250. Accordingly, the secondary storage system 300 inhibits access to the specified secondary volume.

Then, the primary storage system 300 suspends the bi-directional synchronous copy (5510). The primary storage system 300 stores "abnormal" in the copy status information 12102 of the copy pair management information 1210.

The primary storage system 300 and the secondary storage system 300 finish the access control process during suspension of the bi-directional synchronous copy.

As described above, the secondary storage system 300 inhibits access to the secondary volume during suspension of the bi-directional synchronous copy.

During suspension of the bi-directional synchronous copy, the primary storage system 300 may inhibit access to the primary volume rather than the secondary storage system 300 inhibiting access to the secondary volume.

According to this embodiment, the two storage systems 300 supply the logical volumes having identical ID's to the host computer 200. The two storage systems 300 execute bi-directional remote-copying between the logical volumes having the identical ID's. Thus, the two storage systems 300 match the data of the logical volumes having the identical ID's with each other.

The host computer 200 accesses the two logical volumes having the identical ID's as one logical volume. Accordingly, the host computer 200 can access the same data even when access is made to any one of the two storage systems 300 which supply the logical volumes having the identical ID's. Thus, it is possible to enhance I/O processing performance of the host computer 200.

Even when a fault occurs in one of the two storage systems 300 which supply the logical volumes identified by the identical ID's, the host computer 200 can access the storage system 300 in which no fault has occurred. In other words, the host computer 200 can access the data even when one fault occurs in one of the storage systems 300.

(Second Embodiment)

A computer system according to a second embodiment of this invention executes bi-directional asynchronous copy.

A configuration of the computer system of the second embodiment is similar to that of the computer system of the first embodiment of FIG. 1, and thus description thereof will be omitted. A process of the computer system of the second embodiment is similar to that of the computer system of the first embodiment except for a process of an I/O request. Thus, description of the same process will be omitted.

It should be noted that the bi-directional asynchronous copy is an asynchronous copy executed in two directions.

An asynchronous copying process of a storage system 300 will be described. The storage system 300 of a copying source receives a writing request. Immediately after the reception of the writing request, the storage system 300 of the copying source notifies completion of a process of the writing request to a host computer 200. Subsequently, the storage system 300 of the copying source writes write data contained in the received writing request in a logical volume. The storage system 300 of the copying source remote-copies the write data contained in the writing request in a logical volume of a storage system 300 of a copying destination.

In other words, in the asynchronous copying, the storage system 300 transmits the process completion of the writing request to the host computer 200 without completing writing of data. Accordingly, the asynchronous copying is suited to long-distance remote-copying as it is not affected by writing time. However, data consistency must be maintained in the asynchronous copying. To be specific, the storage system 300 must read data according to an issuing sequence of the I/O requests.

Figure 23:
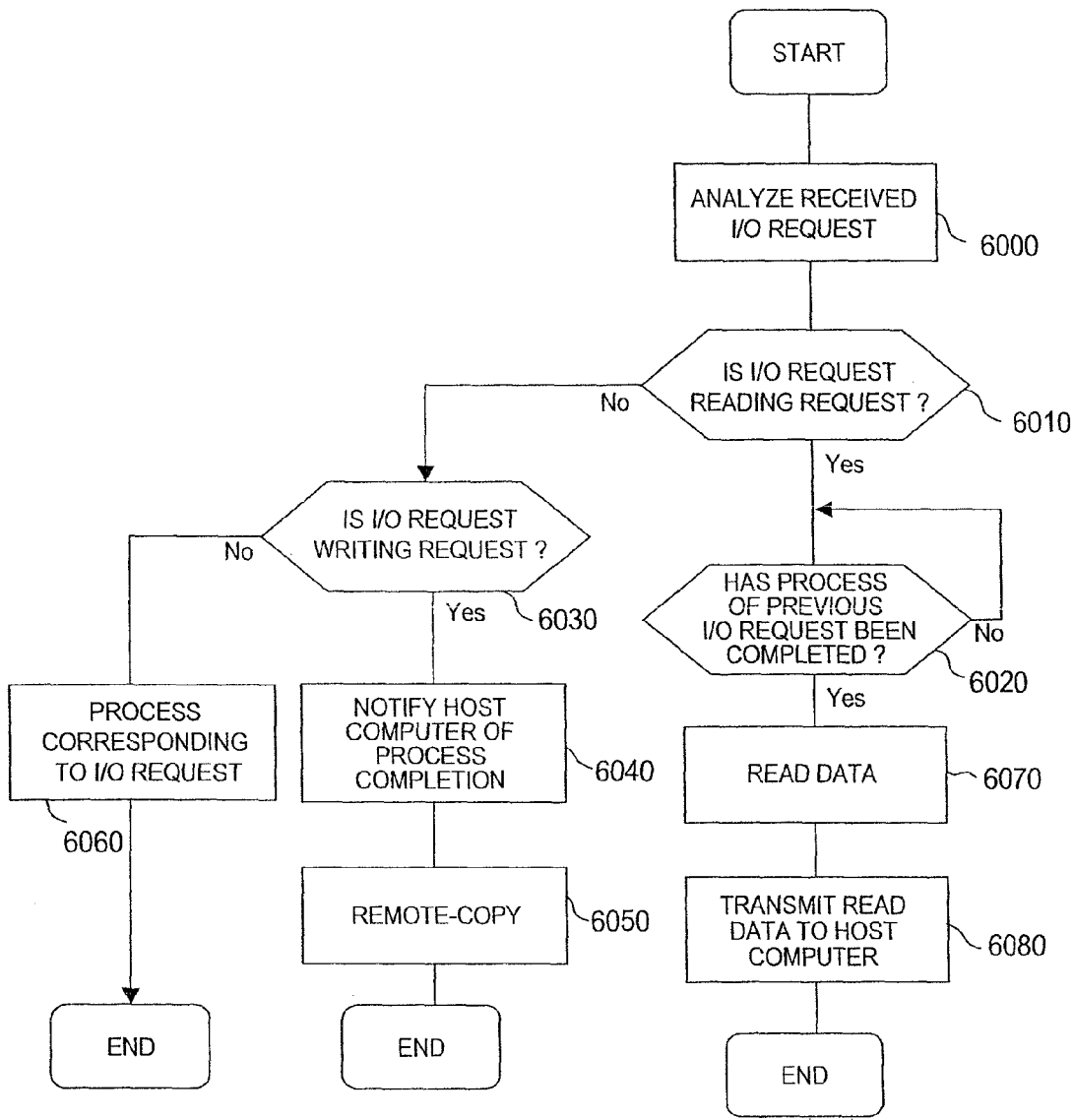
FIG. 23 is a flowchart showing an I/O request process executed by the storage system according to the second embodiment of this invention.

FIG. 23 is a flowchart showing an I/O request process executed by the storage system 300 according to the second embodiment of this invention.

The storage system 300 receives an I/O request 7300 from the host computer 200. Then, the storage system 300 analyzes the received I/O request 7300 (6000). To be specific, the storage system 300 refers to contents of instruction 73002 of the I/O request 7300 for judging a type of the I/O request 7300.

The storage system 300 judges whether the received I/O request 7300 is a reading request or not (6010).

If the I/O request 7300 is a reading request, the storage system 300 judges whether or not a process of an I/O request 7300 issued from the host computer 200 before the received I/O request 7300 has been completed (6020).

To be specific, the storage system 300 extracts a serial number 73003 from the received I/O request 7300. Then, the storage system 300 judges whether or not a process of an I/O request 7300 containing a serial number 70003 smaller than the extracted serial number 73003 has been completed.

If the process of the previously issued I/O request 7300 has not been completed, the storage system 300 stands by until the process of the previously issued I/O request 7300 is completed.

On the other hand, if the process of the previously issued I/O request 7300 has been completed, the storage system 300 reads data requested by the received I/O request 7300 from a logical volume or a cache memory 1100 (6070).

The storage system 300 transmits the read data to the host computer 200 (6080). Then, the storage system 300 finishes the I/O request process.

On the other hand, if the I/O request 7300 is not a reading request, the storage system 300 judges whether the received I/O request 7300 is a writing request or not (6030).

If the I/O request 7300 is a writing request, the storage system 300 notifies a process completion of the I/O request 7300 to the host computer 200. The storage system 300 writes write data contained in the received I/O request 7300 in the logical volume of the storage system 300. Further, the storage system 300 remote-copies the write data contained in the writing request in the logical volume of the storage system 300 of a copying destination (6050). Then, the storage system 300 finishes the I/O request process.

On the other hand, if the I/O request 7300 is not a writing request, the I/O request 7300 is a remote-copy control request or the like. Thus, the storage system 300 executes a process for the I/O request 7300 (6060). Then, the storage system 300 finishes the I/O request process.

According to this embodiment, even when the computer system adopts the bi-directional asynchronous copy for operation, the host computer 200 can access identical data even when access is made to any one of the two storage systems 300 which supply logical volumes having identical ID's.

(Third Embodiment)

According to a third embodiment, a storage system 300 misrepresents an ID of a logical volume supplied from another storage system for supplying it to a host computer 200. The storage system 300 executes remote-copying between cache memories 1100.

Figure 24:
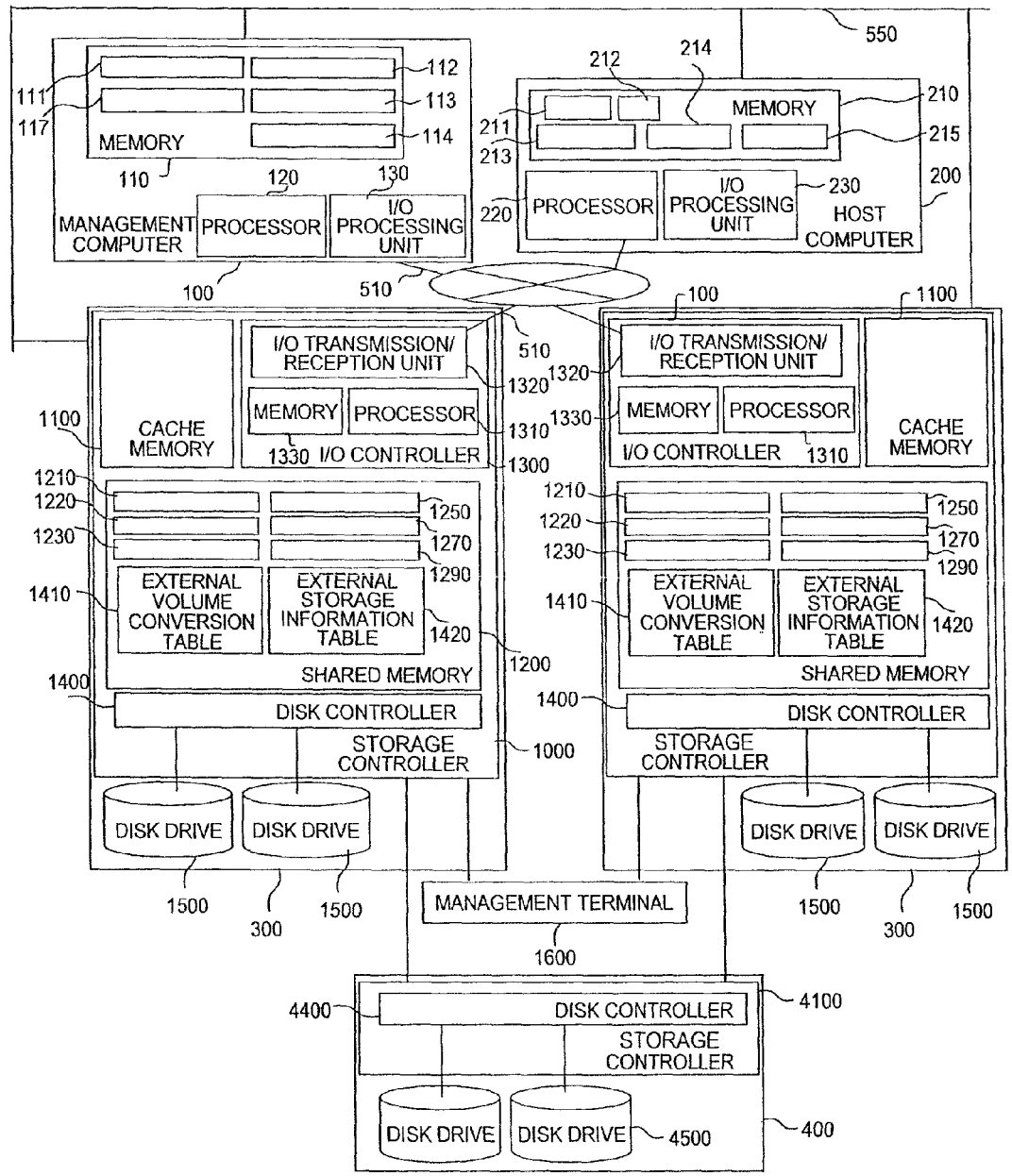
FIG. 24 is a block diagram showing a configuration of a computer system according to the third embodiment of this invention.

FIG. 24 is a block diagram showing a configuration of a computer system according to the third embodiment of this invention.

The computer system of the third embodiment includes a management computer 100, a host computer 200, a storage system 300, an external storage system 400, and a management terminal 1600.

The management computer 100, the host computer 200, and the management terminal 1600 are similar to those of the computer system of the first embodiment, and thus description thereof will be omitted.

The external storage system 400 includes a storage controller 4100 and a disk drive 4500.

The storage controller 4100 controls the entire external storage system 400. To be specific, the storage controller 4100 supplies a storage area of the disk drive 4500 as one or more logical volumes to the storage system 300. The storage controller 4100 includes a disk controller 4400.

The disk controller 4400 controls writing of data in the disk drive 4500 and reading of data from the disk drive 4500.

The storage system 300 is similar in configuration to the storage system of the computer system of the first embodiment. Further, the storage system 300 stores an external volume conversion table 1410 and an external storage information table 1420 in a shared memory 1200.

The external volume conversion table 1410 and the external storage information table 1420 show correspondence between a logical volume supplied to the host computer 200 by misrepresenting an ID and a logical volume of the external storage system 400. It should be noted that the external volume conversion table 1410 and the external storage information table 1420 will be described below in detail with reference to FIG. 25.

The storage system 300 supplies the logical volume (external volume) supplied from the external storage system 400 to the host computer 200 by misrepresenting a storage ID and a logical volume ID. In this case, the two storage systems 300 misrepresent identical external volumes to identical storage ID's and identical logical volume ID's.

Thus, the host computer 200 recognizes the external volumes as one logical volume. In other words, the host computer 200 can access the same external volume even when access is made from any one of the storage systems 300.

According to the third embodiment, the storage system 300 executes remote-copying in two directions not between external volumes but between the cache memories 1100. This is because the number of external volumes supplied to the two storage systems 300 is actually one. Thus, according to the third embodiment, an initial copy process is not necessary. According to this embodiment, bi-directional copy between the cache memories 1100 is called bi-directional cache copying.

An access control process of the third embodiment is similar to the access control process of the first embodiment shown in FIGS. 20 to 22. Thus, description thereof will be omitted.

It should be noted that the computer system of the third embodiment may include a misrepresentation device in place of the storage system 300. The misrepresentation device is similar to the storage system 300 except that no disk drive 1500 is provided.

Figure 25:
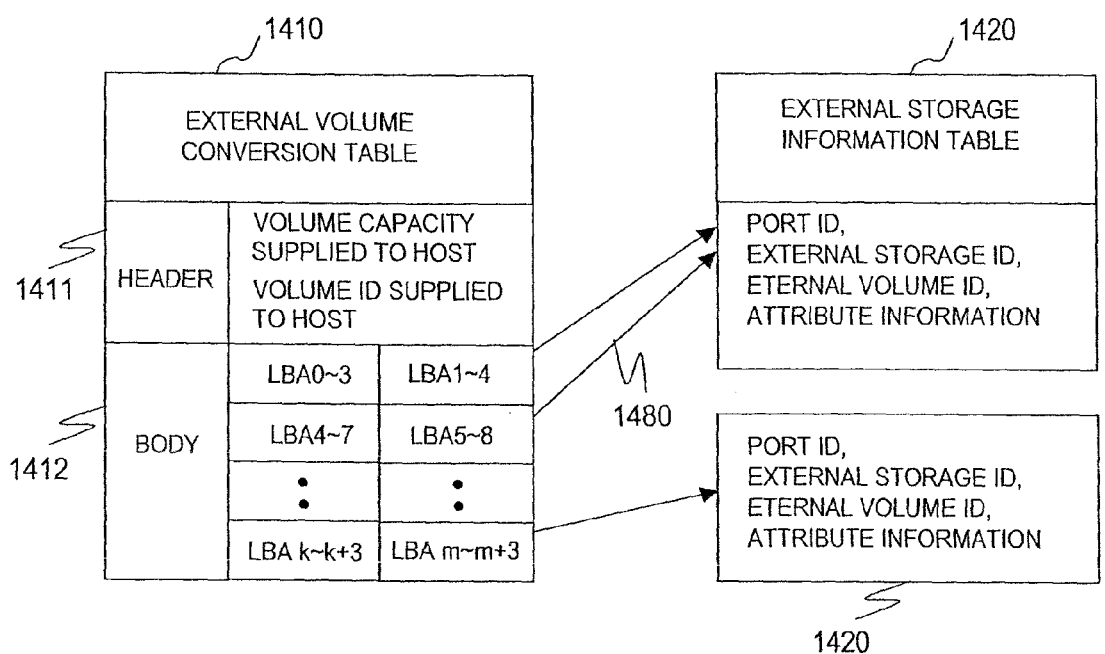
FIG. 25 is an explanatory diagram of the external volume conversion table and the external storage information table according to the third embodiment of this invention.

FIG. 25 is an explanatory diagram of the external volume conversion table 1410 and the external storage information table 1420 according to the third embodiment of this invention.

The external volume conversion table 1410 contains a header 1411 and a body 1412.

The header 1411 is information misrepresented when the external volume is supplied to the host computer 200. To be specific, the header 1411 stores a volume ID supplied to the host, a volume capacity supplied to the host, or the like.

The volume ID supplied to the host is an identifier which enables the host computer 200 to uniquely identify the external volume. The volume capacity supplied to the host is a capacity of the external volume identified by the volume ID supplied to the host.

The body 1412 contains a logical block address (LBA), a pointer to the external storage table, and an offset address.

The LBA indicates a position of a block in the external volume identified by the volume ID supplied to the host. The pointer to the external storage table indicates an external storage information table 1420 corresponding to a block to which the LBA is assigned. The offset address is a start address of the external volume.

The external storage information table 1420 contains an external storage ID, a port ID, an external volume ID, and attribute information.

The external storage ID is a unique identifier of the external storage system 400. The port ID is a unique identifier of an I/O port of the external storage system 400. The external volume ID is a unique identifier of the logical volume supplied from the external storage system 400. The attribute information indicates attributes of the external storage system. For example, the attribute information stores a RAID level or the like of the external storage system 400.

Next, ID misrepresentation of the external volume by the disk controller 1400 of the storage system 300 will be described.

The disk controller 1400 receives an I/O request 7300 from the host computer 200. Then, the disk controller 1400 extracts an address 73001 from the received I/O request 7300. The disk controller 1400 judges whether or not the extracted address 7300 and the host-supplied volume ID contained in the header 1411 of the external volume conversion table 1410 match each other.

If the address 7300 does not match the volume ID supplied to the host, the I/O request 7300 requests access to the disk drive 1500. Accordingly, the disk controller 1400 executes the same process as that of the first embodiment.

On the other hand, if the address 7300 matches the volume ID supplied to the host, the I/O request 7300 requests access to the external volume. Thus, the disk controller 1400 changes the address 73001 of the received I/O request 7300.

To be specific, the disk controller 1400 extracts the LBA of a block to which access is requested by the I/O request 7300 from contents of instruction 7302 of the received I/O request 7300. Then, the disk controller 1400 selects a record in which the extracted LBA matches the LBA of the body 1412 from the external volume conversion table 1410. The disk controller 1400 specifies an external storage information table 1420 corresponding to the extracted LBA based on a pointer of the selected record.

The disk controller 1400 extracts an external storage ID and an external volume ID from the specified external storage information table 1420. The disk controller 1400 stores the extracted external storage ID and the extracted external volume ID in the address 73001 of the received I/O request 7300.

Thus, the disk controller 1400 changes the address 73001 of the received I/O request 7300. Then, the disk controller 1400 transmits the I/O request 7300 of the changed address 73001 to the external storage system 400.

Figure 26:
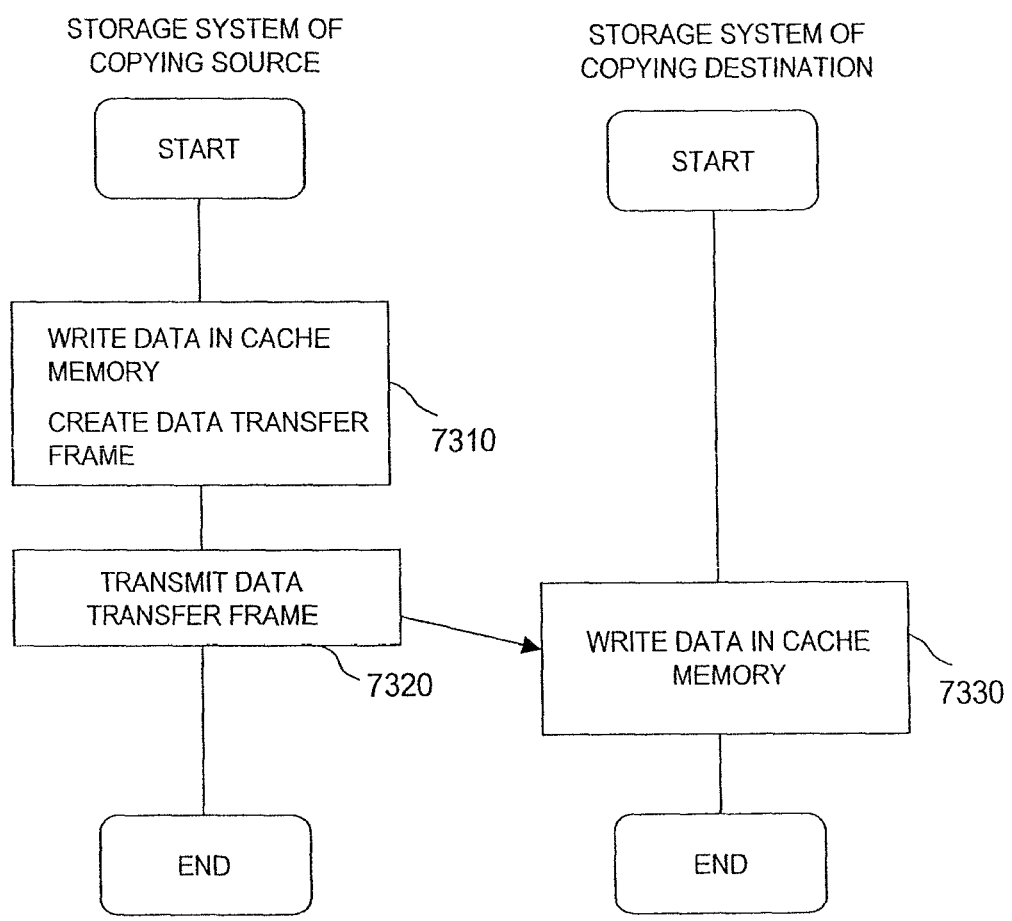
FIG. 26 is a flowchart of a bi-directional cache copy process executed by the storage system according to the third embodiment of this invention.

FIG. 26 is a flowchart of a bi-directional cache copy process executed by the storage system 300 according to the third embodiment of this invention.

For the bi-directional synchronous cache copy process, one storage system 300 can be a copying source or a copying destination. According to this embodiment, the storage system 300 that has received the I/O request from the host computer 200 is set as a storage system 300 of a copying source. Another storage system 300 is set as a storage system 300 of a copying destination.

The storage system 300 of the copying source receives the I/O request 7300 from the host computer 200. The I/O request 7300 is a writing request to the external volume. Then, the storage system 300 of the copying source extracts data (write data) requested to be written from the option 73005 of the received I/O request 7300.

The storage system 300 of the copying source stores the extracted write data in the cache memory 1100 provided in the storage system 300 of the copying source.

The storage system 300 of the copying source creates a data transfer frame 1240 (7310). The storage system 300 of the copying source transmits the created data transfer frame 1240 to the storage system 300 of the copying destination (7320).

The storage system 300 of the copying destination receives the data transfer frame 1240. The storage system 300 of the copying destination stores a transfer data 12404 of the data transfer frame 1240 in the cache memory 1100 provided in the storage system 300 of the copying destination (7330).

Then, the storage system 300 finishes the bi-directional cache copying for one I/O request 7300.

It should be noted that the storage system 300 destages data in the external volume of the external storage system 400 when data is deleted from the cache memory 1100. In this status, the storage systems 300 of the copying source and the copying destination both destage the data deleted from the cache memory 1100 in the external volume.

This does not affect data consistency but increases load on the external storage system 400.

Accordingly, only one of the storage systems 300 of the copying source and the copying destination may destage data deleted from the cache memory 1100 in the external volume.

In this case, the storage system 300 stores a bit (dirty bit) indicating a necessity of destaging the data stored in the cache memory 1100 in the external volume. Further, the storage system 300 includes functions for invalidating the dirty bit stored in the storage system 300, and a function for instructing invalidation of the dirty bit stored in another storage system 300.

After one of the storage systems 300 of the copying source and the copying destination destages the data deleted from the cache memory 1100 in the external volume, unnecessity of destaging the data is instructed to the other storage system 300 (destage nonexecution storage system) 300.

Figure 27:
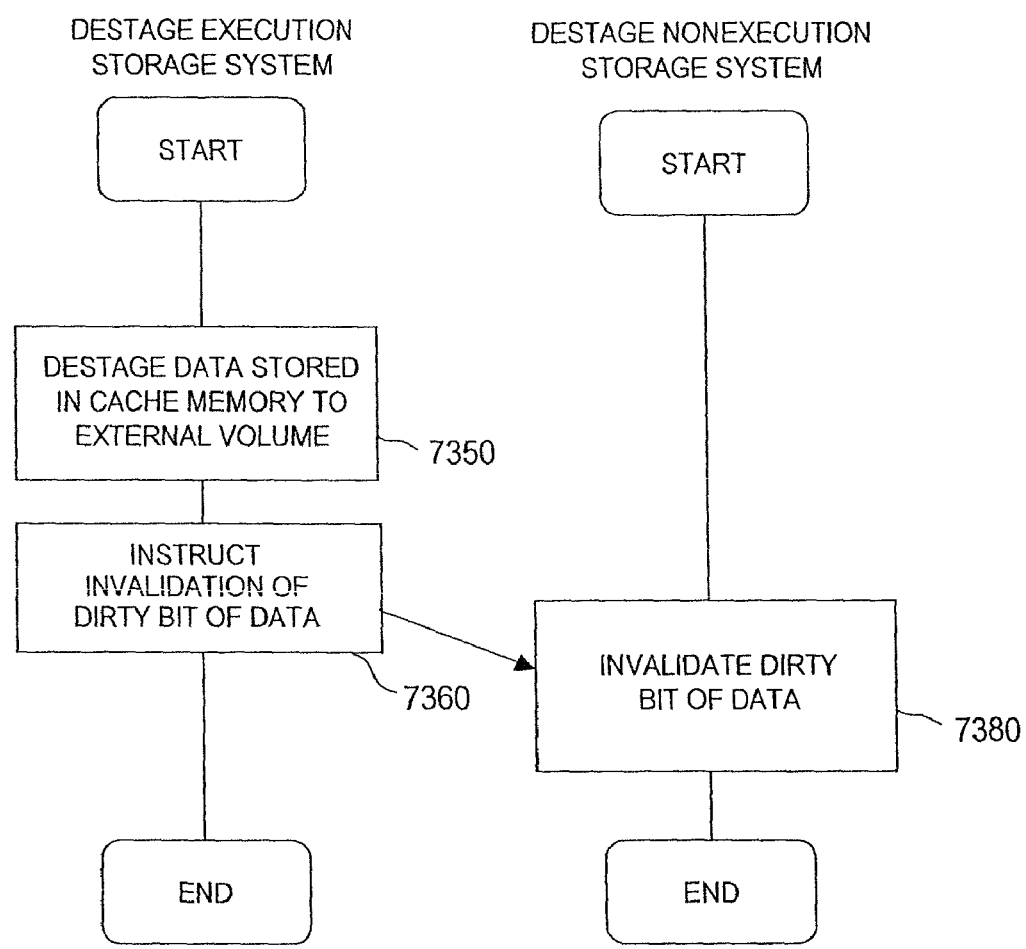
FIG. 27 is a flowchart showing a data destaging process executed by the storage system according to the third embodiment of this invention.

FIG. 27 is a flowchart showing a data destaging process executed by the storage system 300 according to the third embodiment of this invention.

In the data destaging process, one storage system 300 can be a destage execution storage system 300, or a destage nonexecution storage system 300.

When deleting data from the cache memory 1100, the destage execution storage system 300 destages the deleted data in the external volume supplied to the external storage system 400 (7350).

The destage execution storage system 300 instructs invalidation of a dirty bit of the data to the destage nonexecution storage system 300 (7360).

Then, the destage nonexecution storage system 300 invalidates the dirty bit of the data (7380). Accordingly, the destage nonexecution storage system 300 does not destage the deleted data in the external volume when deleting the data from the cache memory 1100.

According to the third embodiment, the two storage systems 300 remote-copy the data of the cache memory 1100 in two directions. Accordingly, consistency of data stored in the cache memories 1100 disposed in the storage systems 300 is maintained. Hence, the host computer 200 can obtain the same data even when accessing an external volume from any one of the storage systems 300.

According to the third embodiment, loads on an I/O transmission/reception unit 1320 of the storage system 300 are dispersed. Thus, I/O performance of the host computer 200 can be enhanced.

Furthermore, according to the third embodiment, the two storage systems 300 remote-copy the data of the cache memory in two directions. Thus, even when the host computer 200 distributes and transmits the I/O request to the two storage systems 300, a high cache hit rate can be maintained. The cache hit rate is a probability of storage of data requested by the host computer 200 in the cache memory.

While the present invention has been described in detail and pictorially in the accompanying drawings, the present invention is not limited to such detail but covers various obvious modifications and equivalent arrangements, which fall within the purview of the appended claims.

What is claimed is:

1. A computer system comprising:
a host computer configured to:
    store path definition information including a storage ID, a volume ID, and validities of a plurality of paths between the host computer and one of a first storage system or a second storage system identified by the storage ID for accessing a certain volume identified by the volume ID in the one of the first storage system or the second storage system;
    send an I/O request via the plurality of paths, based on the path definition information;
    receive information indicating the storage ID and the volume ID; and
    update the path definition information based on the received information,
wherein the first storage system includes a first interface, a first disk drive, and a first controller which provides, via the first interface, a first volume using the first disk drive;
wherein the second storage system is coupled to the first storage system, and includes a second interface, a second disk drive, and a second controller which provides, via the second interface, a second volume using the second disk drive, wherein the second controller is configured to copy data of the second volume to the first volume,
wherein, during initial copying from the second volume to the first volume, a validity corresponding to a first path between the host computer and the first interface, included in the path definition information, is set to "Invalid" to inhibit access from the host computer to the first interface via the first path and a validity corresponding to a second path between the host computer and the second interface, included in the path definition information, is set to "Valid" to permit access from the host computer to the second interface via the second path, and
wherein, after completion of the initial copying, the host computer is configured to change the validity corresponding to the first path included in the path definition information from "Invalid" to "Valid" to permit access from the host computer to the first interface via the first path, while access continues to be permitted between the host computer and the second interface via the second path.

2. A computer system according to claim 1,
wherein, if the second controller receives the I/O request for writing data from the host computer, the second controller is configured to store the data requested to be written and copy the data to the first volume, and
wherein, if the first controller receives the I/O request for writing data from the host computer, the first controller is configured to store the data requested to be written and copy the data to the second volume.

3. A computer system according to claim 2,
wherein, if the copying data by either of the first controller or the second controller is suspended, the host computer is configured to change the validity corresponding to the first path included in the path definition information from "Valid" to "Invalid".

4. A computer system according to claim 1,
wherein the I/O request sent by the host computer includes a request for reading data from the first volume or the second volume.

5. A method of operating a computer system which includes a host computer, said method comprising the host computer:
storing path definition information including a storage ID, a volume ID, and validities of a plurality of paths between the host computer and one of a first storage system or a second storage system identified by the storage ID for accessing a certain volume identified by the volume ID in the one of the first storage system or the second storage system;
sending an I/O request via the plurality of paths, based on the path definition information;
receiving information indicating the storage ID and the volume ID; and
updating the path definition information based on the received information,
wherein the first storage system includes a first interface, a first disk drive, and a first controller which provides, via the first interface, a first volume using the first disk drive;
wherein the second storage system is coupled to the first storage system, and includes a second interface, a second disk drive, and a second controller which provides, via the second interface, a second volume using the second disk drive, wherein the second controller is configured to copy data of the second volume to the first volume, said method further comprising:
during initial copying from the second volume to the first volume, setting a validity corresponding to a first path between the host computer and the first interface, included in the path definition information to "Invalid" to inhibit access from the host computer to the first interface via the first path, and setting a validity corresponding to a second path between the host computer and the second interface, included in the path definition information, to "Valid" to permit access from the host computer, to the second interface via the second path; and
after completion of the initial copying, changing the validity corresponding to the first path included in the path definition information from "Invalid" to "Valid" to permit access from the host computer to the first interface via the first path, while access continues to be permitted between the host computer and the second interface via the second path.

6. The method of operating a computer system according to claim 5, the method further comprising:
the second controller, if the second controller receives the I/O request for writing data from the host computer, storing the data requested to be written and copying the data to the first volume, and
the first controller, if the first controller receives the I/O request for writing data from the host computer, storing the data requested to be written and copying the data to the second volume.

7. The method of operating a computer system according to claim 6, the method further comprising:
if the copying data by either of the first controller or the second controller is suspended, the host computer changing the validity corresponding to the first path included in the path definition information from "Valid" to "Invalid".

8. The method of operating a computer system according to claim 5,
wherein the I/O request sent by the host computer includes a request for reading data from the first volume or the second volume.

9. A computer system comprising:
a host computer configured to:
store path definition information including a storage ID, a volume ID, and validities of a plurality of paths between the host computer and one of a first storage system or a second storage system identified by the storage ID for accessing a certain volume identified by the volume ID in the one of the first storage system or the second storage system;
send an I/O request via the plurality of paths, based on the path definition information;
receive information indicating the storage ID and the volume ID; and
update the path definition information based on the received information,
wherein the first storage system includes a first interface, a first disk drive, and a first controller which provides, via the first interface, a first volume using the first disk drive;
wherein the second storage system is coupled to the first storage system, and includes a second interface, a second disk drive, and a second controller which provides, via the second interface, a second volume using the second disk drive, wherein the second controller is configured to copy data of the second volume to the first volume,
wherein, said system further comprises means for maintaining consistency between data stored in the first and second storage systems, including means for inhibiting access from the host computer to the first interface via a first path during initial copying of data from the second volume of the second storage system to the first volume of the first storage system, and means for permitting access from the host computer to both the first interface via the first path and to the second interface via a second path after completion of the initial copying of data from the second volume to the first volume.

10. A computer system according to claim 9,
wherein, if the second controller receives the I/O request for writing data from the host computer, the second controller is configured to store the data requested to be written and copy the data to the first volume, and
wherein, if the first controller receives the I/O request for writing data from the host computer, the first controller is configured to store the data requested to be written and copy the data to the second volume.

11. A computer system according to claim 10,
wherein, if the copying data by either of the first controller or the second controller is suspended, the host computer is configured to change the validity corresponding to the first path included in the path definition information from "Valid" to "Invalid".

12. A computer system according to claim 9,
wherein the I/O request sent by the host computer includes a request for reading data from the first volume or the second volume.

* * * * *